(12) United States Patent
McGrath

(10) Patent No.: US 6,671,791 B1
(45) Date of Patent: Dec. 30, 2003

(54) PROCESSOR INCLUDING A TRANSLATION UNIT FOR SELECTIVELY TRANSLATING VIRTUAL ADDRESSES OF DIFFERENT SIZES USING A PLURALITY OF PAGING TABLES AND MAPPING MECHANISMS

(75) Inventor: Kevin J. McGrath, Los Gatos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 224 days.

(21) Appl. No.: 09/881,910

(22) Filed: Jun. 15, 2001

Related U.S. Application Data
(60) Provisional application No. 60/224,368, filed on Aug. 9, 2000.

(51) Int. Cl.[7] .................................... G06F 12/10
(52) U.S. Cl. ........................... 711/206; 711/208
(58) Field of Search ............... 711/206, 207, 711/208

(56) References Cited

U.S. PATENT DOCUMENTS

| | | | |
|---|---|---|---|
| 4,620,274 A | 10/1986 | Boothroyd et al. | 711/217 |
| 4,763,250 A | 8/1988 | Keshlear et al. | 711/208 |
| 5,481,684 A | 1/1996 | Richter et al. | 712/212 |
| 5,584,005 A * | 12/1996 | Miyaoku et al. | 711/206 |
| 5,696,925 A | 12/1997 | Koh | 711/203 |
| 5,774,686 A | 6/1998 | Hammond et al. | 712/209 |
| 5,784,638 A | 7/1998 | Goetz et al. | 712/43 |
| 5,787,495 A | 7/1998 | Henry et al. | 711/208 |
| 5,826,074 A | 10/1998 | Blomgren | 711/206 |
| 5,854,913 A * | 12/1998 | Goetz et al. | 711/207 |
| 6,223,271 B1 * | 4/2001 | Cepulis | 711/206 |
| 6,289,431 B1 * | 9/2001 | Bigbee et al. | 711/206 |
| 6,349,380 B1 * | 2/2002 | Shahidzadeh et al. | 711/206 |
| 6,393,544 B1 * | 5/2002 | Bryg et al. | 711/206 |

OTHER PUBLICATIONS

Intel, "Intel Architecture Software Developer's Manual, vol. 1: Basic Architecture," 1997, pp. 3–1–3–15.
Intel. "Pentium Pro Family Developer's Manual, vol. 3: Operating System Writer's Guide," 1996, pp. 2–1–2–21, 3–1–3–33, and 4–1–4–29.
*The Technology Behind Crusoe™ Processors, Low–Power x86–Compatible Processors Implemented with Code Morphing™ Software*, Transmeta Corporation, Jan. 2000, pp. 1–18.
*Alpha Learns to Do Windows; Digital's FX!32 is The Key to Running Win32 Software on Alpha/Windows NT.*, Selinda Chiquoine. Byte, Aug. 4, 1998, 4 pages.
*Awards Stacks Up for Digital FX!32 Windows Compatibility Software for Alpha*, Digital Press Releases, Dec. 11,1 997, 7 pages.
*Digital FX!32; White Paper: How Digital FX!32 Works*, Digital Semiconductor, Jan. 26, 1998, 4 pages.
*An Alpha in PC Clothing; Digital Equipment's New x86 Emulator Technology Makes An Alpha System a Fast x86 Clone*, Tom Thompson, Byte, Aug. 4, 1998, 7 pages.

(List continued on next page.)

Primary Examiner—Glenn Gossage
(74) Attorney, Agent, or Firm—Lawrence J. Merkel; Meyertons, Hood, Kivlin, Kowert & Goetzel, P.C.

(57) ABSTRACT

Various methods and systems for mapping virtual addresses having more than 32 bits, such as 48 or 64 bits, to physical addresses are disclosed. A processor includes a translation unit that translates or maps a virtual address to a physical address. The translation unit may translate a virtual address to a physical address using either a first or second mapping mechanism (e.g., a first or second plurality of paging tables, with entries respectively having first and second sizes) supporting virtual addresses having at most a first number of bits, such as 32 bits, or a third page mapping mechanism (e.g., a third plurality of page tables) supporting virtual address having more than the first number of bits, such as 48 bits or 64 bits. The translation unit may select the first or second plurality of paging tables depending on the active operating mode of the processor.

12 Claims, 22 Drawing Sheets

OTHER PUBLICATIONS

*AMD 64–Bit Technology; The AMD x86 Architecture Programmers Overview*, AMD, Publication #24108 Rev: A, Aug. 2000, pp. 1–106.

*AMD 64–Bit Technology; The AMD x86–64 Architecture Programmers Overview*, AMD Publication #24108 Rev: C, Jan. 2001, pp. 1–128.

* cited by examiner

| LMA | CS L Bit | CS D Bit | Operating Mode |
|---|---|---|---|
| 0 | x | 0 | 16 Bit Mode |
| 0 | x | 1 | 32 Bit Mode |
| 1 | 0 | 0 | 16 Bit Compatibility Mode |
| 1 | 0 | 1 | 32 Bit Compatibility Mode |
| 1 | 1 | 0 | 32/64 Mode |
| 1 | 1 | 1 | Reserved |

Level 4 Entry

Bits 63–52: Available
Bits 51–40: Reserved, MBZ
Bits 39–32: Base Address
Bits 31–12: Page Directory Pointer Base Address
Bits 11–9: Available
Bits 8–7: Reserved, MBZ
Bit 6: A
Bit 4: PCD
Bit 3: PWT
Bit 2: U/S
Bit 1: R/W
Bit 0: P

Page Directory Pointer Table Entry

Bits 63–52: Available
Bits 51–40: Reserved, MBZ
Bits 39–32: Base Address
Bits 31–12: Page Directory Base Address
Bits 11–9: Available
Bits 8–7: Reserved, MBZ
Bit 6: A
Bit 4: PCD
Bit 3: PWT
Bit 2: U/S
Bit 1: R/W
Bit 0: P

Page Directory Entry

Bits 63–52: Available
Bits 51–40: Reserved, MBZ
Bits 39–32: Base Address
Bits 31–12: Page Table Base Address
Bits 11–9: Available
Bits 8–6: 0, 0, 0
Bit 5: A
Bit 4: PCD
Bit 3: PWT
Bit 2: U/S
Bit 1: R/W
Bit 0: P

Page Table Entry

Bits 63–52: Available
Bits 51–40: Reserved, MBZ
Bits 39–32: Base Address
Bits 31–12: Page Base Address
Bits 11–9: Available
Bit 8: G
Bit 7: PAT
Bit 6: D
Bit 5: A
Bit 4: PCD
Bit 3: PWT
Bit 2: U/S
Bit 1: R/W
Bit 0: P

Fig. 8C

Page Map Level 4 Entry

Page Directory Pointer Table Entry

Page Directory Entry

PROCESSOR INCLUDING A TRANSLATION UNIT FOR SELECTIVELY TRANSLATING VIRTUAL ADDRESSES OF DIFFERENT SIZES USING A PLURALITY OF PAGING TABLES AND MAPPING MECHANISMS

This application claims benefit of priority to Provisional Application Ser. No. 60/224,368 filed Aug. 9, 2000.

BACKGROUND OF THE INVENTION

1. Field of the Invention

This invention relates to paging systems and, more particularly, to a paging system for translating virtual addresses having more than 32 bits.

2. Description of the Related Art

The x86 architecture (also known as the IA-32 architecture) has enjoyed widespread acceptance and success in the marketplace. Accordingly, it is advantageous to design processors according to the x86 architecture. Since such processors may execute software from the large body of software written for the x86 architecture, computer systems employing these processors may enjoy increased acceptance in the market due to the large amount of available software.

As computer systems have continued to evolve, 64-bit address size (and sometimes operand size) has become desirable. A larger address size allows for programs having a larger memory footprint (the amount of memory occupied by the instructions in the program and the data operated upon by the program) to operate within the memory space. A larger operand size allows for operating upon larger operands, or for more precision in operands. More powerful applications and/or operating systems may be possible using 64-bit address and/or operand sizes. Thus, it may be desirable to provide an architecture which is compatible with the x86 processor architecture but which includes support for 64-bit processing as well.

Unfortunately, extending the x86 processor architecture to 64 bits may be problematic. For example, extending virtual addresses to 64 bits may present challenges. Virtual addresses allow a processor to map pages of virtual memory space to pages in actual physical memory space and/or disk storage space. Before the actual physical memory space can be accessed, the virtual addresses need to be translated to physical addresses. This process is known as address translation or memory mapping, and may be performed by hardware, software, or a combination of both. Typically, virtual addresses are translated to physical addresses using some sort of paging system. These paging systems may be constructed in a way that depends upon the expected virtual and/or physical address sizes. Thus, if virtual addresses are to be extended to 64 bits, the paging system may need to be redefined, creating additional compatibility issues.

Currently, several paging systems are available for the x86 architecture. One such paging system is shown in FIG. 1. In this paging system, a 32-bit virtual address 101 is being translated to a physical address 121. Several paging tables 110, which are used to translate the virtual address, and a 4 kilobyte (Kb) page of physical memory 120 are also shown. Each of the paging tables may be contained in a 4 Kb page that can contain up to 1024 ($2^{10}$) 32-bit entries. In this system, the page directory base register, CR3, points to the base address of first paging table, the page directory table 110a. The page directory table entries each contain a pointer, and each pointer is a base address of a page table such as page table 110b. The upper 10 bits 31:22 of the virtual address 101 specify an offset within the page directory 110a. Thus, bits 31:22 and the pointer in CR3 can be used to locate entry 111a in the page directory table 110a.

In the illustrated example, the page directory entry 111a contains a pointer to the base address of page table 110b. The middle field of the virtual address 101, bits 21:12, specifies an offset within page table 110b. This offset and the pointer in page directory entry 111a can be used to locate page table entry 111b. The page table entry 111b contains a pointer, which is a base address of a page of physical memory 120. The offset specified in the lowest 12 bits 11:0 of the virtual address 101 is an offset within the page of physical memory. Thus, the base address found in the page table entry 111b can be concatenated with the offset specified in bits 11:0 of the virtual address to get the physical address 121.

One variation of the paging system shown in FIG. 1 may simply use one paging table. CR3 may point to a base address of a page directory table, and the upper bits 31:22 of the virtual address may specify an offset within that page directory table. The entry in the page directory table located using that offset may contain the base address of a page of physical memory. The lower bits 21:0 of the virtual address may then specify the offset within that page to specify the physical address. Because 22 bits are used to specify the offset, the pages of physical memory can be 4 Megabytes (Mb) in size.

In FIG. 2A, three paging tables 110a–110c (collectively, paging tables 110) are used for memory mapping. The page directory base register 34, CR3, points to a base address of a page directory pointer table 210c. The highest order pair of bits 31:30 provides an offset within page directory pointer table 210c. Since two bits are used for the offset within the page directory pointer table 210c, as opposed to the nine bits used for the other paging tables 210a and 210b, the first paging table is smaller than the other two paging tables. Thus, page directory pointer table 210c may contain a maximum of four entries, while the other two paging tables 210a and 210b may contain up to 512 ($2^9$) entries.

In FIG. 2A, three paging tables 110 are used for memory mapping. The page directory base register 34, CR3, points to a base address of a page directory pointer table 210c. The highest order pair of bits 31:30 provides an offset within page directory pointer table 210c. Since two bits are used for the offset within the page directory pointer table 210, as opposed to the nine bits used for the other paging tables 210a and 210b, the first paging table is smaller than the other two paging tables. Thus, page directory pointer table 210c may contain a maximum of four entries, while the other two paging tables 210a and 210b may contain up to 512 ($2^9$) entries.

The paging tables 210a–210c (collectively, paging tables 210) in FIG. 2A may be used to translate a virtual address 201 to a physical address in a manner similar to that described with respect to FIG. 1. For example, the page directory pointer table entry 211c contains the base address of a page directory table 210a. Likewise, the directory bits 29:21 in the virtual address 201 identify an offset within the page directory table 210a, and the entry 211a located using that offset contains a pointer to a page table 210b. The pointer to the page table and the table bits 20:12 in the virtual address 201, which describe an offset within the page table 210b, can be used to locate a page table entry 211b. This page table entry 211b contains a base address of a page 220 in physical memory, and this base address can be concatenated with the offset bits 11:0 in the virtual address 201 to generate the physical address 221.

FIG. 2B shows a similar x86 paging system for 36-bit physical addresses. Unlike the system shown in FIG. 2A, this system maps virtual addresses to 2 Mb pages and uses two paging tables. Because the physical pages are 2 Mb in size, as opposed to 4 Kb, more bits of the virtual address may be used to specify the offset. Thus, in this embodiment, the lowermost 21 bits of the virtual address specify an offset within a physical page of memory, allowing each page to be $2^{21}$=2 Mb in size. Generally, the paging tables shown in FIG. 2B may be used in much the same manner as those shown in FIG. 2A.

All of the above paging systems are limited to 32-bit virtual addresses. If more than 32 bits are used, the above systems will not be able to provide unique mapping of virtual addresses to physical address. Therefore, these address translation systems would be unworkable with larger virtual addresses.

SUMMARY

Various embodiments of methods and systems for mapping virtual addresses having more than 32 bits to physical addresses are disclosed. Generally, these embodiments may provide unique mappings of virtual addresses having more than 32 bits to physical addresses by using all of the implemented virtual address bits when traversing a series of paging tables. For example, instead of using two or three paging tables to map virtual addresses, one embodiment may use four paging tables. Thus, if 9 virtual address bits are used to specify each offset within each level of paging tables and 12 virtual address bits are used to specify an offset within a physical page, such an embodiment provides unique mappings of 4*9+12=48-bit virtual addresses. Certain embodiments may also provide backward compatibility with 32-bit applications.

In one embodiment, a processor may include an execution core configured to generate a virtual address and a translation unit configured to translate the virtual address to a physical address by accessing multiple paging tables. For example, the translation unit may be configured to access a first paging table entry using a first base address of a first paging table and a first offset comprised within a first portion of the virtual address. The first paging table entry stores a second base address of a second paging table. The translation unit may also be configured to access a second paging table entry using the second base address and a second offset comprised within a second portion of the virtual address. The second paging table entry stores a third base address of a third paging table. The translation unit may be configured to access a third paging table entry using the third base address and a third offset comprised within a third portion of the virtual address, and the third paging table entry may store a fourth base address of a fourth paging table. Similarly, the translation unit may be configured to access a fourth paging table entry using the third base address and a third offset comprised within a third portion of the virtual address, and the fourth paging table entry may store a base address of a page of physical memory. The translation unit may then be configured to obtain the physical address by concatenating the base address of the page of physical memory with a final offset comprised within a final portion of the virtual address. In some embodiments, a processor configured to translate virtual addresses may be included within a computer system.

In another embodiment, a method of translating a virtual address into a physical address is disclosed. The method includes locating a first entry within a first paging table using a first pointer to the first paging table and a first offset comprised within a first portion of the virtual address. The first entry within the first paging table stores a second pointer to a second paging table. A second entry in the second paging table may be located using the second pointer and a second offset comprised within a second portion of the virtual address. The second entry stores a third pointer to a third paging table, and thus a third entry in the third paging table may be located using the third pointer and a third offset included in a third portion of the virtual address. The third entry stores a fourth pointer to a fourth paging table, allowing a fourth entry in the fourth paging table to be located using the fourth pointer and a fourth offset comprised within a fourth portion of the virtual address. The fourth entry may store a final pointer to (base address of) a page of physical memory. The physical address may be obtained by concatenating the base address of the page of physical memory with a final offset comprised within a final portion of the virtual address.

In another embodiment, a plurality of paging system data structures are stored on a carrier medium. The paging system data structures may comprise a first paging table comprising a plurality of first paging table entries, one or more second paging tables, wherein each second paging table comprises a plurality of second paging table entries, one or more third paging tables, wherein each third paging table comprises a plurality of third paging table entries, and one or more fourth paging tables, wherein each fourth paging table comprises a plurality of fourth paging table entries. Each fourth paging table entry may be configured to store a base address of a physical page in memory. Each first paging table entry may be configured to store a base address of one of the second paging tables. Similarly, each second paging table entry may be configured to store a base address of one of the third paging tables, and each third paging table entry may be configured to store a base address of one of the fourth paging tables. In one embodiment, the paging system data structures may include six paging tables.

In other embodiments, multiple program instructions may be stored on a carrier medium. The program instructions are computer-executable to locate a first entry within a first paging table using a first pointer to the first paging table and a first offset comprised within a first portion of the virtual address, wherein the first entry within the first paging table comprises a second pointer to a second paging table. The program instructions are similarly computer-executable to locate a second entry within the second paging table using the second pointer to the second paging table and a second offset comprised within a second portion of the virtual address. The second entry comprises a third pointer to a third paging table. The program instructions are computer-executable to locate a third entry within the third paging table using the third pointer to the third paging table and a third offset comprised within a third portion of the virtual address, wherein the third entry comprises a fourth pointer to a fourth paging table. Also, the program instructions are computer-executable to locate a fourth entry within the fourth paging table using the fourth pointer to the fourth paging table and a fourth offset comprised within a fourth portion of the virtual address, wherein the fourth entry comprises a final pointer to (base address of) a page of physical memory. The program instructions are also computer-executable to obtain the physical address by concatenating the a base address of the page of physical memory with a final offset comprised within a final portion of the virtual address.

In another embodiment, a processor may include an execution core configured to generate a virtual address and a translation unit configured to translate the virtual address to a physical address. The translation unit may be configured to perform the address translation using either of two possible page mapping mechanisms that support virtual addresses having up to a first number of bits (e.g., 32 bits) and another page mapping mechanism that supports virtual addresses having more than that number of bits. The page mapping mechanism used may depend on the operating mode of the processor.

A processor may be configured to translate a virtual address to a physical address using several different sets of paging tables in another embodiment. In one set of paging tables, each paging table entry may have a first size (e.g., 4 bytes). In two other sets of paging tables, each paging table entry may have a second size (e.g., 8 bytes). The second two sets of paging tables (having second-sized entries) may each include different numbers of levels of paging tables. The set of paging tables with more levels of paging tables may support virtual addresses having more bits than the other set of paging tables supports.

In still another embodiment, a processor may be configured to translate virtual addresses to physical addresses using different sets of paging tables depending on which operating mode the processor is in. The same range of virtual address bits may be used to index a table in each of two different sets of tables. For example, the range of virtual address bits 20:12 may be used to index a table in both a first and a second set of paging tables.

BRIEF DESCRIPTION OF THE DRAWINGS

FIG. 6 is a table illustrating one embodiment of operating modes as a function of segment descriptor and control register values.

FIG. 8C is a block diagram of one embodiment of paging table formats that may be used in the paging system shown in FIG. 8A.

Figure 1:
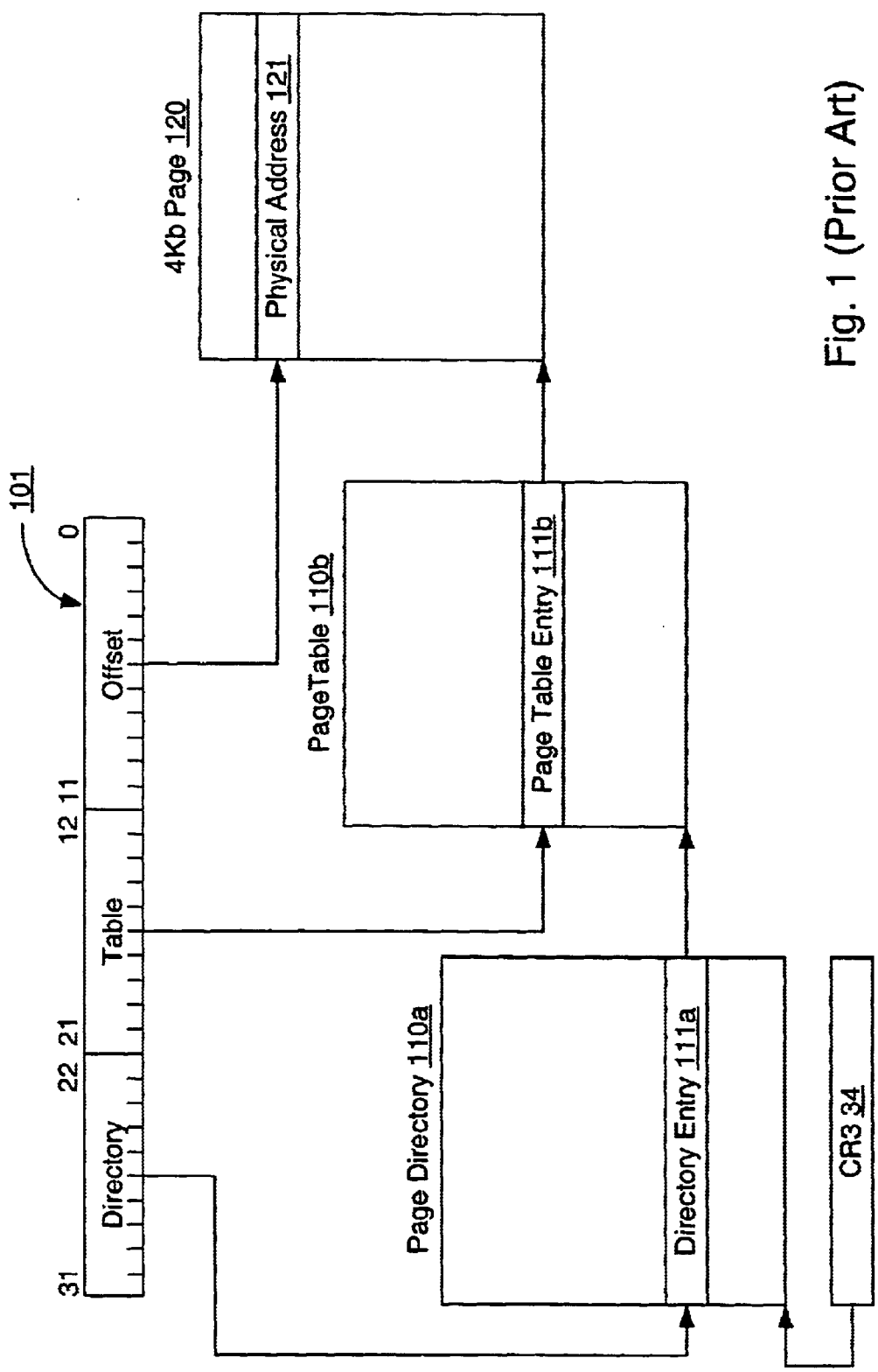
FIG. 1 is a block diagram of a prior art paging system for translating virtual addresses to physical addresses.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Processor Overview

Figure 3:
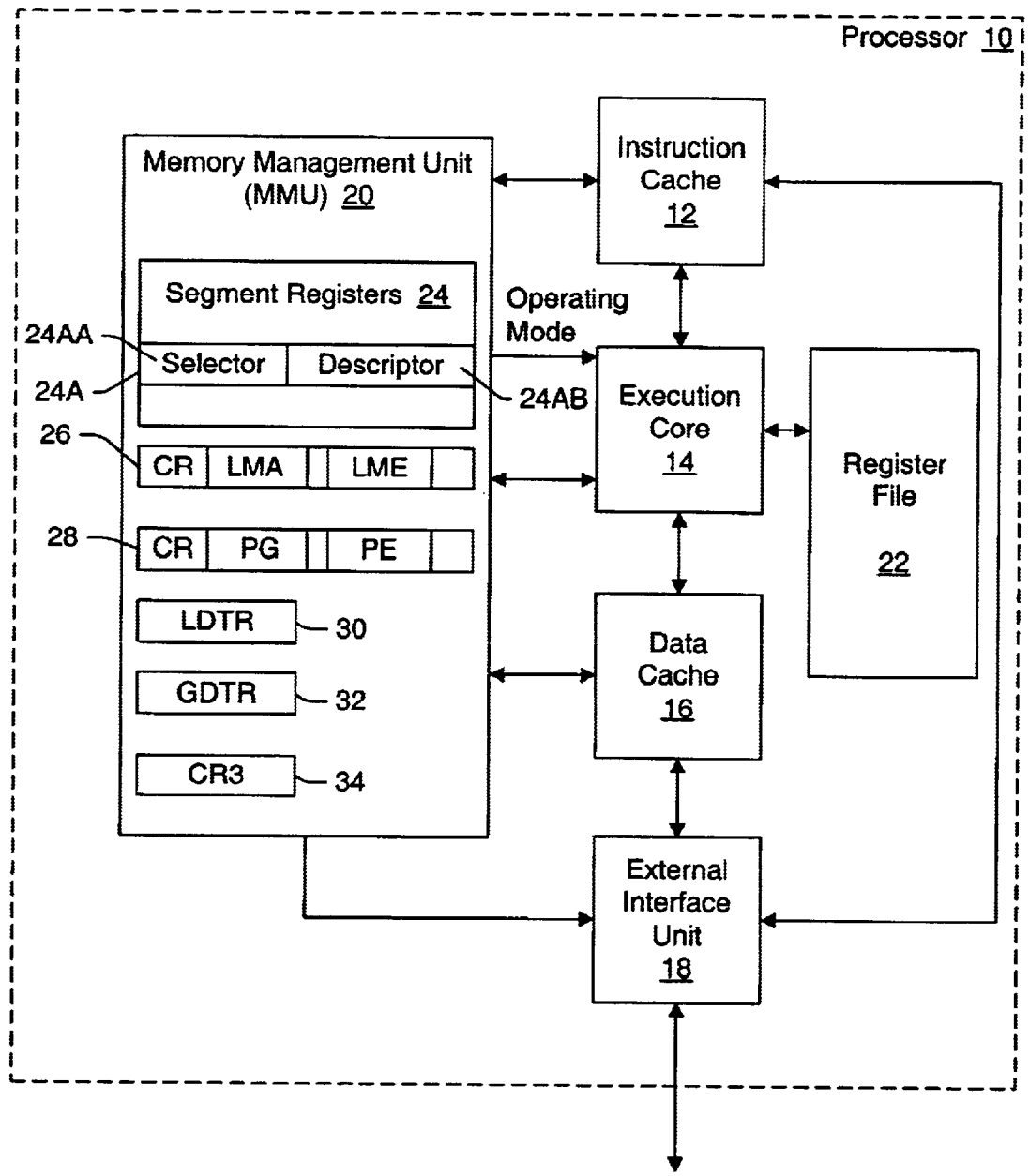
FIG. 3 is a block diagram a processor, according to one embodiment.

Turning now to FIG. 3, a block diagram illustrating one embodiment of a processor 10 is shown. Other embodiments are possible and contemplated. In the embodiment of FIG. 3, processor 10 includes an instruction cache 12, an execution core 14, a data cache 16, an external interface unit 18, a memory management unit (MMU) 20, and a register file 22. In the illustrated embodiment, MMU 20 includes a set of segment registers 24, a first control register 26, a second control register 28, a local descriptor table register (LDTR) 30, a global descriptor table register (GDTR) 32, and a page table base address register (CR3) 34. Instruction cache 12 is coupled to external interface unit 18, execution core 14, and MMU 20. Execution core 14 is further coupled to MMU 20, register file 22, and data cache 16. Data cache 16 is further coupled to MMU 20 and external interface unit 18. External interface unit 18 is further coupled to MMU 20 and to an external interface.

Processor 10 may employ a processor architecture compatible with the x86 architecture (also known as the IA-32 architecture) and including additional architectural features to support 64-bit processing. More particularly, the processor architecture employed by processor 10 may define a mode, which is referred to below as "long mode." In long mode, 64-bit processing is selectable as an operating mode in addition to the 32-bit or 16-bit processing specified in the x86 architecture. More particularly, long mode may provide for an operating mode in which virtual addresses may be greater than 32 bits in size.

Processor 10 may implement a mechanism allowing for orderly transition to and from long mode, even though multiple registers may be changed to perform the transition. Particularly, processor 10 may employ a long mode active (LMA) indication in a control register (e.g., control register 26 in the present embodiment, although the LMA indication may be stored in any control register, including control registers not storing the LME indication). The processor 10 may use the LMA indication as the indication of whether or not long mode is active (i.e. whether or not the processor is operating in long mode). However, the LMA indication may not be modified directly via an instruction. Instead, an instruction is used to change the state of the long mode enable (LME) indication to indicate whether or not long mode is desired. Long mode may be activated (as indicated by the LMA indication) via the combination of enabling paging (as indicated by the PG indication in control register 28 and described in more detail below) and the LME indication indicating that long mode is desired. Viewed in another way, the LME indication may be used to enable the transition to long mode. The LMA indication may indicate whether or not the transition has successfully occurred, and thus indicates whether processor 10 is operating according to the long mode definition or processor 10 is operating according to the legacy definition of the x86 processor architecture.

Processor 10 is configured to establish an operating mode in response to information stored in a code segment descriptor corresponding to the currently executing code and further in response to one or more enable indications stored in one or more control registers. As used herein, an "operating mode" specifies default values for various programmably selectable processor attributes. For example, the operating mode may specify a default operand size and a default address size. The default operand size specifies the number of bits in an operand of an instruction, unless an instruction's encoding overrides the default. The default address size specifies the number of bits in an address of a memory operand of an instruction, unless an instruction's encoding overrides the default. The default address size specifies the size of at least the virtual address of memory operands. As used herein, a "virtual address" is an address generated prior to translation through an address translation mechanism (e.g., a paging mechanism) to a "physical address," which is the address actually used to access a memory. Additionally, as used herein, a "segment descriptor" is a data structure created by software and used by the processor to define a segment of memory and to further define access control and status for the segment. A "segment descriptor table" is a table in memory storing segment descriptors. Since there is more than one operating mode, the operating mode in effect at any given time may be described as being the "active" operating mode.

In the illustrated embodiment, MMU 20 determines an operating mode and conveys an indication of the operating mode to execution core 14. Execution core 14 executes instructions in accordance with the operating mode. More particularly, execution core 14 fetches operands having the default operand size from register file 22 or memory (through data cache 16, if the memory operands are cacheable and hit therein, or through external interface unit 18 if the memory operands are non-cacheable or miss data cache 16) unless a particular instruction's encoding overrides the default operand size, in which case the overriding operand size is used. Similarly, execution core 14 generates addresses of memory operands, wherein the addresses have the default address size unless a particular instruction's encoding overrides the default address size, in which case the overriding address size is used. In other embodiments, information used to determine the operating mode may be shadowed locally in the portions of processor 10 which use the operating mode (e.g., execution core 14), and the operating mode may be determined from the local shadow copies.

As mentioned above, MMU 20 determines the operating mode responsive to a code segment descriptor corresponding to the code being executed and further responsive to one or more values in control registers. Information from the code segment descriptor is stored in one of the segment registers 24 (a register referred to as CS, or code segment). Additionally, control register 26 stores a long mode enable indication (LME) that is used to enable transition to long mode and the LMA indication indicating whether or not long mode is active. In long mode, an operating mode in which the default address size is greater than 32 bits ("32/64 mode") as well as certain compatibility modes for the 32-bit and 16-bit operating modes may be available using the segment descriptor indications. The default operand size may be 32 bits in 32/64 mode, but instructions may override the default 32-bit operand size with a 64-bit operand size when desired. If the LME indication is in an enabled state, then long mode may be activated. If the LME indication is in a disabled state, then long mode may not be activated. In one embodiment, the default address size in 32/64 mode may be implementation-dependent but may be any value up to and including 64 bits. Furthermore, the size of the virtual address may differ in a given implementation from the size of the physical address in that implementation.

It is noted that various indications are described herein (e.g., LMA, LME, etc.). Generally, an indication is a value that may be placed into two or more states. Each state may be assigned a meaning. Some of the indications described herein (including some enable indications) may be described as bits. The bit being set may be one state (e.g., the enabled state for enable indications) and the bit being clear may be the other state (e.g., the disabled state for enable indications). However, other encodings are possible, including encodings in which multiple bits are used and encodings in which the enabled state is the clear state and the disabled state is the set state. Accordingly, the remainder of this description may refer to the LME indication in control register 26 as the LME bit, with the enabled state being set and the disabled state being clear. However, other encodings of the LME indication are contemplated, as set forth above. Similarly, the LMA indication may be referred to as the LMA bit, with the set state indicating that long mode is active and the clear state indicating that long mode is inactive. However, other encodings of the LMA indication are contemplated, as set forth above.

Segment registers 24 store information from the segment descriptors currently being used by the code being executed by processor 10. As mentioned above, CS is one of segment registers 24 and specifies the code segment of memory. The code segment stores the code being executed. Other segment registers may define various data segments (e.g., a stack data segment defined by the SS segment register, and up to four data segments defined by the DS, ES, FS, and GS segment registers). FIG. 3 illustrates the contents of an exemplary segment register 24A, including a selector field 24AA and a descriptor field 24AB. Selector field 24AA is loaded with a segment selector to activate a particular segment in response to certain segment load instructions executed by execution core 14. The segment selector locates the segment descriptor in a segment descriptor table in memory. More particularly, processor 10 may employ two segment descriptor tables: a local descriptor table and a global descriptor table. The base address of the local descriptor table is stored in the LDTR 30. Similarly, the base address of the global descriptor table is stored in GDTR 32. A bit within the segment selector (the table indicator bit) selects the descriptor table, and an index within the segment selector is used as an index into the selected table. When an instruction loads a segment selector into one of segment registers 24, MMU 20 reads the corresponding segment descriptor from the selected segment descriptor table and stores information from the segment descriptor into the segment descriptor field (e.g., segment descriptor field 24AB for segment register 24A). The information stored in the segment descriptor field may comprise any suitable subset of the segment descriptor, including all of the segment descriptor, if desired. Additionally, other information derived from the segment descriptor or other sources may be stored in the segment descriptor field, if desired. For example, an embodiment may decode the operating mode indications from the code segment descriptor and store the decoded value rather than the original values of the operating mode indications. If an instruction causes CS to be loaded with a segment selector, the code segment may change and thus the operating mode of processor 10 may change.

In one embodiment, only the CS segment register is used in 32/64 mode. The data segment registers are ignored from the standpoint of providing segmentation information. In 16-bit and 32-bit modes, the code segment and data segments may be active. Furthermore, a second enable indication PE (Protect Enable) in control register 28 may affect the operation of MMU 20. The PE enable indication may be used to enable protected mode, in which segmentation and/or paging address translation mechanisms may be used. If the PE enable indication is in the disabled state, segmentation and paging mechanisms are disabled and processor 10 is in "real mode" (in which addresses generated by execution core 14 are physical addresses). Similar to the LME indication, the PE indication may be a bit in which the enabled state is the bit being set and the disabled state is the bit being clear. However, other embodiments are contemplated as described above. Generally, a "protected mode" is a mode in which various hardware and/or software mechanisms are employed to provide controlled access to memory.

Control register 28 is further illustrated in FIG. 3 as storing a paging enable indication (PG). The PG indication may indicate whether or not paging is enabled. As mentioned above, the LMA bit is set once paging is enabled and the LME bit is set. As used herein, the term "paging" or "paging address translation" refers to the translation of virtual addresses to physical addresses using mappings stored in a page table structure indicated by the page table base address register 34. A given page mapping maps any virtual address having the same virtual page number to a corresponding physical address in a page of physical memory. The page table is a predefined table of entries stored in memory. Each of the entries stores information used to map virtual addresses to physical addresses.

It is noted that MMU 20 may employ additional hardware mechanisms, as desired. For example, MMU 20 may include paging hardware to implement paging address translation from virtual addresses to physical addresses. The paging hardware may include a translation lookaside buffer (TLB) to store page translations.

It is noted that control registers 26 and 28 may be implemented as architected control registers (e.g., control register 26 may be CR4 and control register 28 may be CR0). Alternatively, one or both of the control registers may be implemented as model specific registers to allow for other uses of the architected control registers without interfering with 32/64 mode. Generally, the control registers are each addressable by one or more instructions defined in the processor architecture, so that the registers may be changed as desired.

Instruction cache 12 is a high speed cache memory for storing instruction bytes. Execution core 14 fetches instructions from instruction cache 12 for execution. Instruction cache 12 may employ any suitable cache organization, including direct-mapped, set associative, and fully associative configurations. If an instruction fetch misses in instruction cache 12, instruction cache 12 may communicate with external interface unit 18 to fill the missing cache line into instruction cache 12. Additionally, instruction cache 12 may communicate with MMU 20 to receive physical address translations for virtual addresses fetched from instruction cache 12.

Execution core 14 executes the instructions fetched from instruction cache 12. Execution core 14 fetches register operands from register file 22 and updates destination registers in register file 22. The size of the register operands is controlled by the operating mode and any overrides of the operating mode for a particular instruction. Similarly, execution core 14 fetches memory operands from data cache 16 and updates destination memory locations in data cache 16, subject to the cacheability of the memory operands and hitting in data cache 16. The size of the memory operands is similarly controlled by the operating mode and any overrides of the operating mode for a particular instruction. Furthermore, the size of the addresses of the memory operands generated by execution core 14 is controlled by the operating mode and any overrides of the operating mode for a particular instruction.

Execution core 14 may employ any suitable construction. For example, execution core 14 may be a superpipelined core, a superscalar core, or a combination thereof. Execution core 14 may employ out of order speculative execution or in order execution, according to design choice. Execution core 14 may include microcoding for one or more instructions or exception situations, in combination with any of the above constructions.

Register file 22 may include 64-bit registers that may be accessed as 64-bit, 32-bit, 16-bit, or 8-bit registers as indicated by the operating mode of processor 10 and any overrides for a particular instruction. The registers included in register file 22 may include the RAX, RBX, RCX, RDX, RDI, RSI, RSP, and RBP registers (which may be 64-bit versions of the EAX, EBX, ECX, EDX, EDI, ESI, ESP, and EBP registers defined in the x86 processor architecture, respectively). Additionally, in one embodiment, register file 22 may include additional registers addressed using a register extension (REX) prefix byte. Register file 22 may further include the RIP register, which may be a 64-bit version of the EIP register. Alternatively, execution core 14 may employ a form of register renaming in which any register within register file 22 may be mapped to an architected register. The number of registers in register file 22 may be implementation dependent for such an embodiment.

Data cache 16 is a high speed cache memory configured to store data. Data cache 16 may employ any suitable cache organization, including direct-mapped, set-associative, and fully-associative configurations. If a data fetch or update misses in data cache 16, data cache 16 may communicate with external interface unit 18 to fill the missing cache line into data cache 16. Additionally, if data cache 16 employs a writeback caching policy, updated cache lines that are being cast out of data cache 16 may be communicated to external interface unit 18 to be written back to memory. Data cache 16 may communicate with MMU 20 to receive physical address translations for virtual addresses presented to data cache 16.

External interface unit 18 communicates with portions of the system external to processor 10. External interface unit 18 may communicate cache lines for instruction cache 12 and data cache 16 as described above, and may communicate with MMU 20 as well. For example, external interface unit 18 may access the segment descriptor tables and/or paging tables on behalf of MMU 20.

It is noted that processor 10 may include an integrated level 2 (L2) cache, if desired. Furthermore, external interface unit 18 may be configured to communicate with a backside cache in addition to communicating with the system.

While the processor architecture described herein may be compatible with the x86 processor architecture for 16 and 32 bit modes, in one embodiment, other embodiments may employ any 16 and 32 bit modes. The other embodiments may or may not be compatible with the x86 processor architecture or any other processor architecture. It is further noted that, while a specific set of information is described herein as being used to determine the operating mode, any combination of indications and/or information from memory data structures such as segment descriptor tables and page tables may be used to generate the operating mode in various embodiments.

Figure 4:
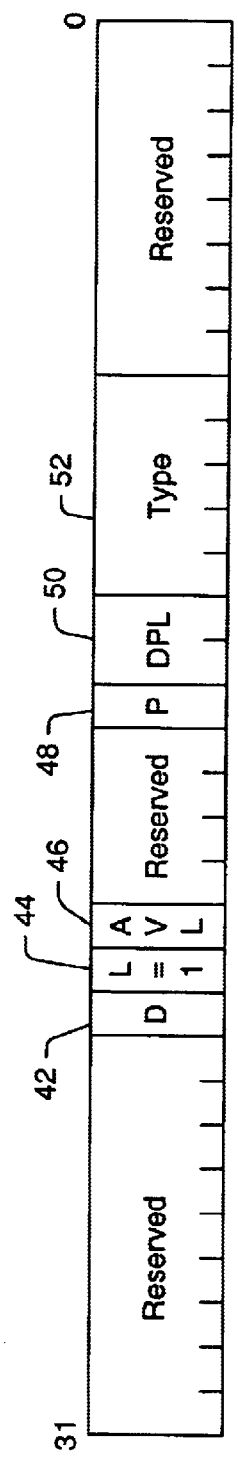
FIG. 4 is a block diagram of one embodiment of a segment descriptor for 32/64 mode.
Figure 4:
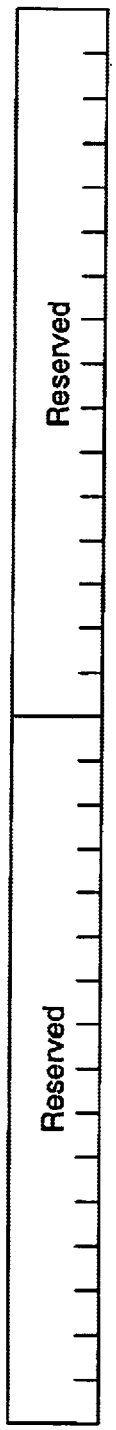

Turning now to FIG. 4, a block diagram of one embodiment of a code segment descriptor 40 for 32/64 mode is shown. Other embodiments are possible and contemplated. In the embodiment of FIG. 4, code segment descriptor 40 comprises 8 bytes with the most significant 4 bytes illustrated above the least significant 4 bytes. The most significant four bytes are stored at a numerically larger address than the least significant four bytes. The most significant bit of each group of four bytes is illustrated as bit 31 in FIG. 4 (and FIG. 5 below), and the least significant bit is illustrated as bit 0. Short vertical lines within the four bytes delimit each bit, and the long vertical lines delimit a bit but also delimit a field (both in FIG. 4 and in FIG. 5).

Figure 5:
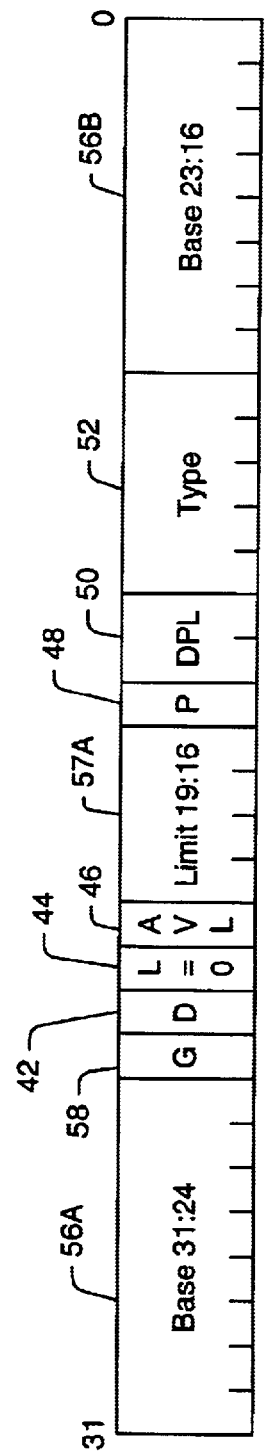
FIG. 5 is a block diagram of one embodiment of a segment descriptor for compatibility mode.
Figure 5:

Unlike the 32-bit and 16-bit code segment descriptors discussed in conjunction with FIG. 5, code segment descriptor 40 does not include a base address or limit. Processor 10 employs a flat virtual address space for 32/64 mode (rather than the segmented linear address space employed in 32-bit and 16-bit modes). Accordingly, the portions of code segment descriptor 40 that would otherwise store the base address and limit are reserved in segment descriptor 40. It is noted that a virtual address provided through segmentation may also be referred to herein as a "linear address." The term "virtual address" encompasses any address which is translated through a translation mechanism to a physical address actually used to address memory, including linear addresses and other virtual addresses generated in non-segmented architectures.

Segment descriptor 40 includes a D bit 42, an L bit 44 (set to one for a 32/64 mode code segment), an available bit (AVL) 46, a present (P) bit 48, a descriptor privilege level (DPL) 50, and a type field 52. D bit 42 and L bit 44 are used to determine the operating mode of processor 10. AVL bit 46 is available for use by system software (e.g., the operating system). P bit 48 is used to indicate whether or not the segment is present in memory. If P bit 48 is set, the segment is present and code may be fetched from the segment. If P bit 48 is clear, the segment is not present and an exception is generated to load the segment into memory (e.g., from disk storage or through a network connection). The DPL indicates the privilege level of the segment. Processor 10 employs four privilege levels (encoded as 0 through 3 in the DPL field, with level 0 being the most privileged level). Certain instructions and processor resources (e.g., configuration and control registers) are only executable or accessible at the more privileged levels, and attempts to execute these instructions or access these resources at the lower privilege levels result in an exception. When information from code segment 40 is loaded into the CS segment register, the DPL becomes the current privilege level (CPL) of processor 10. Type field 52 encodes the type of segment. For code segments, the most significant bit of type field 52 may be set (the most significant bit distinguishing a code or data segment from a system segment, and the second most significant bit distinguishing a code segment from a data segment), and the remaining bits may encode additional segment type information (e.g., execute only, execute and read, or execute and read only, conforming, and whether or not the code segment has been accessed).

It is noted that, while several indications in the code segment descriptor are described as bits, with set and clear values having defined meanings, other embodiments may employ the opposite encodings and may use multiple bits, as desired. Thus, for example, the D bit 42 and the L bit 44 may each be an example of an operating mode indication which may be one or more bits as desired, similar to the discussion of enable indications above.

Turning now to FIG. 5, a block diagram of one embodiment of a code segment descriptor 54 for 32- and 16-bit compatibility mode is shown. Other embodiments are possible and contemplated. As with the embodiment of FIG. 4, code segment descriptor 54 comprises 8 bytes with the most significant 4 bytes illustrated above the least significant 4 bytes.

Code segment descriptor 54 includes D bit 42, L bit 44, AVL bit 46, P bit 48, DPL 50, and type field 52 similar to the above description of code segment descriptor 40. Additionally, code segment descriptor 54 includes a base address field (reference numerals 56A, 56B, and 56C), a limit field (reference numerals 57A and 57B) and a G bit 58. The base address field stores a base address that is added to the logical fetch address (stored in the RIP register) to form the linear address of an instruction, which may then optionally be translated to a physical address through a paging translation mechanism. The limit field stores a segment limit that defines the size of the segment. Attempts to access a byte at a logical address greater than the segment limit are disallowed and cause an exception. G bit 58 determines the scaling of the segment limit field. If G bit 58 is set the limit is scaled to 4K byte pages (e.g., 12 least significant zeros are appended to the limit in the limit field). If G bit 58 is clear, the limit is used as is.

It is noted that code segment descriptors for 32- and 16-bit modes when long mode is not active may be similar to code segment descriptor 54, except the L bit is reserved and defined to be zero. It is further noted that, in 32- and 16-bit modes (both compatibility mode with the LMA bit set and modes with the LMA bit clear) according to one embodiment, data segments are used as well. Data segment descriptors may be similar to code segment descriptor 54, except that the D bit 42 is defined to indicate the upper bound of the segment or to define the default stack size (for stack segments).

Turning next to FIG. 6, a table 70 is shown illustrating the states of the LMA bit, the L bit in the code segment descriptor, and the D bit in the code segment descriptor and the corresponding operating mode of processor 10 according to one embodiment of processor 10. Other embodiments are possible and contemplated. As table 70 illustrates, if the LMA bit is clear, then the L bit is reserved (and defined to be zero). However, processor 10 may treat the L bit as a don't care if the LMA bit is clear. Thus, the x86 compatible 16-bit and 32-bit modes may be provided by processor 10 if the LMA bit is clear. If the LMA bit is set and the L bit in the code segment is clear, then a compatibility operating mode is established by processor 10 and the D bit selects 16-bit or 32-bit mode. If the LMA bit and the L bit are set and the D bit is clear, 32/64 mode is selected for processor 10. Finally, the mode that would be selected if the LMA, L and D bits were all set is reserved.

As mentioned above, the 32/64 operating mode includes a default address size in excess of 32 bits (implementation dependent but up to 64 bits) and a default operand size of 32 bits. The default operand size of 32 bits may be overridden to 64 bits via a particular instruction's encoding. The default operand size of 32 bits is selected to minimize average instruction length (since overriding to 64 bits involves including an instruction prefix in the instruction encoding which may increase the instruction length) for programs in which 32 bits are sufficient for many of the data manipulations performed by the program. For such programs (which may be a substantial number of the programs currently in existence), moving to a 64-bit operand size may actually reduce the execution performance achieved by the program (i.e. increased execution time). In part, this reduction may be attributable to the doubling in size in memory of the data structures used by the program when 64-bit values are stored. If 32 bits are sufficient, these data structures may store 32-bit values. Thus, the number of bytes accessed when the data structure is accessed increases if 64-bit values are used where 32-bit values would be sufficient, and the increased memory bandwidth (and increased cache space occupied by each value) may cause increased execution time. Accordingly, 32 bits is selected as the default operand size and the default may be overridden via the encoding of a particular instruction.

Paging System

Figure 7:
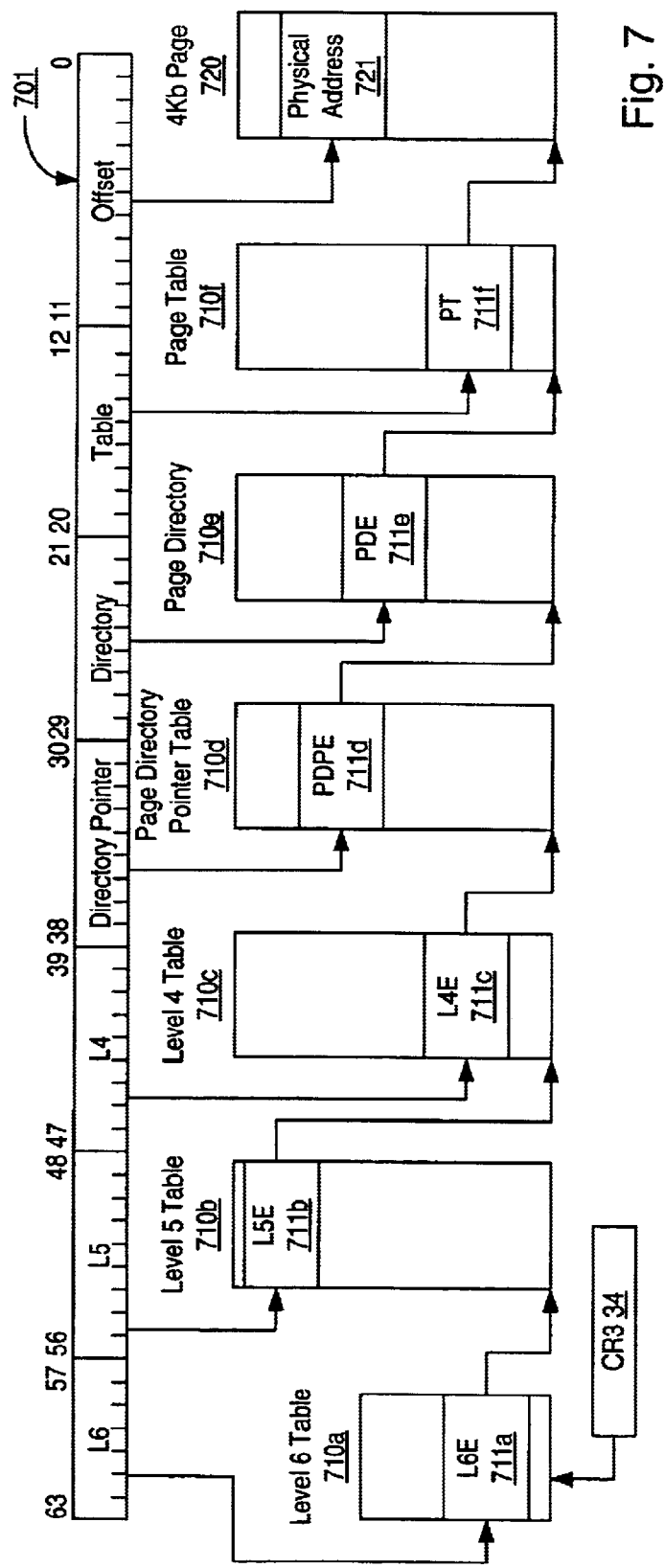
FIG. 7 is a block diagram of a paging system, according to one embodiment.
Figure 8A:
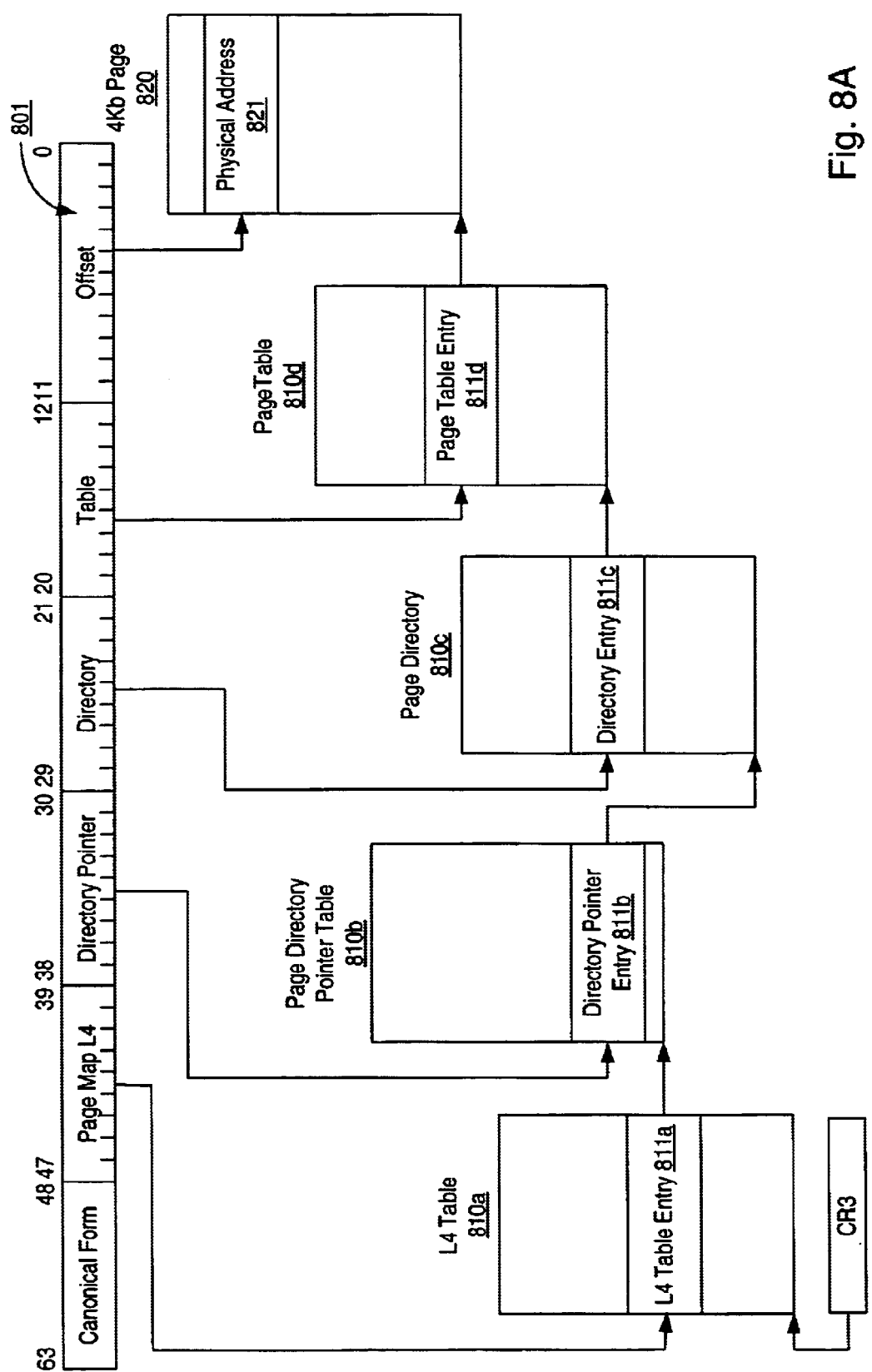
FIG. 8A illustrates a paging system, according to another embodiment.
Figure 8B:
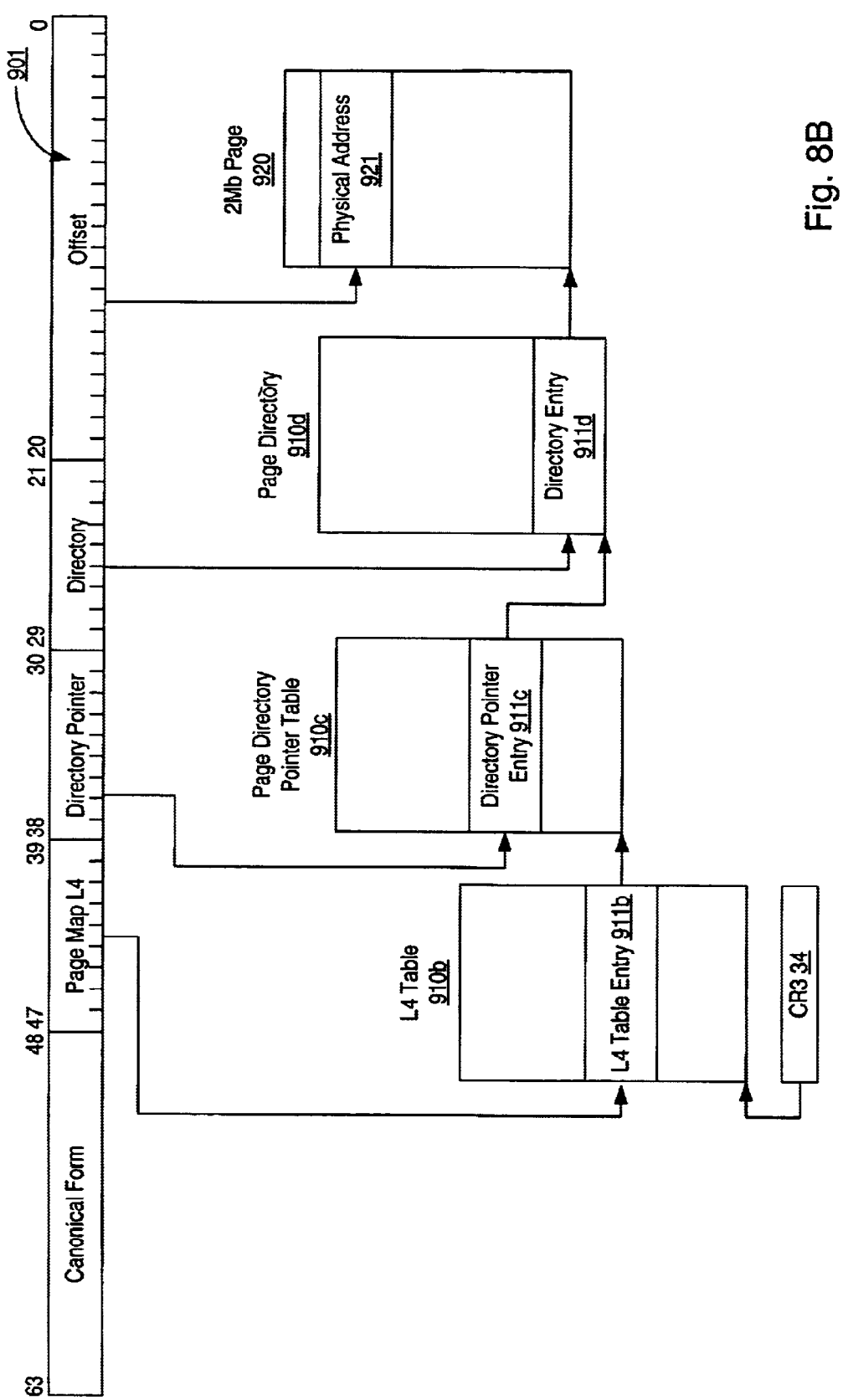
FIG. 8B illustrates a paging system, according to yet another embodiment.

In order for a processor such as processor 10 to implement additional architectural features that support 64-bit processing, a new paging system is required to uniquely map 64-bit (or any implemented number of virtual address bits greater than 32, up to and including 64 bits) virtual addresses to physical addresses. In some embodiments, such a paging system may also provide compatibility with applications that use 32-bit virtual addresses. For example, FIG. 7 illustrates an embodiment of a paging system that maps 64-bit virtual addresses to physical addresses while also providing compatibility with 32-bit software. In other embodiments, it may be desirable to implement virtual addresses using some other number of bits. For example, FIGS. 8A and 8B show similar embodiments that map 48-bit virtual addresses to physical addresses. In some embodiments, multiple paging systems may be used to provide for both 64-bit processing and compatibility with the x86 architecture.

Turning now to FIG. 7, one embodiment of a paging system that may be used to map a 64-bit virtual address 701 to a physical address 721 is illustrated. In this embodiment, all 64 bits of the virtual address are used to specify a virtual address, and 6 levels of paging tables 710*a*–710*f* are used to perform the address translation. Note that throughout this disclosure, drawing elements identified by the same numeral followed by a distinct letter (e.g., paging tables 710*a*–710*f*) may be collectively referred to by that numeral alone (e.g., paging tables 710). For clarity, only one paging table at each level is illustrated. However, there may be multiple paging tables in some levels (e.g., there may be more tables at every level except for the level 6 table level, since that table is located by the address in CR3). The paging table data structures may be stored in main memory. In some embodiments, translation-lookaside buffers (TLBs) may be used to cache recently-translated addresses.

In the illustrated embodiment, the uppermost 7 bits (labeled the L6 bits) of the virtual address 701 specify an offset within the level 6 table 710*a*. Since 7 bits are used (as opposed to the 9 bits used for offsets into the other paging tables 71*b*–*f*) to specify an offset within the level 6 table, the maximum number of entries in the level 6 table is $2^7=128$ entries, while the other page tables may have up to 512 ($2^9$) entries. In embodiments where longer virtual addresses are used, the number of entries in the level 6 table may be increased. Also, other embodiments may use different numbers of virtual address bits to specify the offset relative to one or more of the paging table levels. For example, instead of using 9 bits to specify the offset into each table, one embodiment may use 8 (resulting in paging tables with 256 entries) or 10 bits (resulting in paging tables with 1024 entries). Nine bits may be preferable, however, since if each entry is 8 bytes, having 512 entries per table results in tables which each fill a 4 Kb page. However, some embodiments may have unequally-sized paging tables, so 8 bits of the virtual address may be used to specify an offset for one level of paging tables, while 10 virtual-address bits may be used to specify an offset for a different level of paging tables.

In the illustrated embodiment, the page directory base register 34, CR3, may be configured to store a pointer to the level 6 table 710*a*. Together, CR3 and the L6 bits in the virtual address 701 specify an entry 711*a* in the level 6 table 710*a*. Generally, each entry in the level 6 table 710*a* contains a pointer to a level 5 table, such as level 5 table 710*b*. As illustrated, the page map level 6 entry 711*a* identified by the pointer stored in CR3 and the offset contained in the L6 bits of the virtual address contains a pointer to a level 5 table 710*b*.

In this embodiment, the L5 bits 56:48 in the virtual address specify an offset in a level 5 table. Thus, the L5 bits and the base address specified in the level 6 table entry 711*a* may be used to reference an entry 711*b* in a level 5 table. Like the level 6 table, each entry in the level 5 table contains a pointer that is the base address of a level 4 table such as level 4 table 710*c*. In the illustrated example, the level 5 table entry 711*b* is identified by the level 6 table entry 711*a* and the offset specified in the L5 bits of the virtual address. This L5 entry contains the base address of the level 4 table 710*c*.

The L4 bits 47:39 in the virtual address specify an offset in a level 4 table 710*c*. This offset and the pointer from the level 5 table entry 711*b* may be used to reference an entry 711*c* in level 4 table 710*c*. In this embodiment, each entry in the level 4 table contains a pointer to a page directory pointer table such as page directory pointer table 710*d*. In the illustrated example, the level 4 table entry 711*c* is identified by the level 5 table entry 711*b* and the offset specified in the L4 bits of the virtual address and contains the base address of the page directory pointer table 710*d*.

The Directory Pointer bits 38:30 in the virtual address specify an offset in a page directory pointer table 710*d*. This offset and the base address from the level 4 table entry 711*c* may be used to reference an entry 711*d* in a page directory pointer table 710*d*. In this embodiment, each entry in the page directory pointer table contains a base address of a page directory table such as page directory table 710*e*. In the illustrated example, the page directory pointer table entry 711d is identified by the level 4 table entry 711c and the offset specified in the Directory Pointer bits of the virtual address and contains a pointer to the page directory table 710e.

The Directory bits 29:21 in the virtual address specify an offset in a page directory table. Thus, the offset specified in the Directory bits and the base address specified in the page directory pointer table entry 711d may be used to reference an entry 711e in a page directory table such as table 710e. Each entry in the page directory table contains a base address of a page table such as page table 710f. In the illustrated example, the page table entry 711e is identified by the page directory pointer table entry 711d and the offset specified in the Directory bits of the virtual address and contains a pointer to the page table 710f.

The Table bits 20:12 in the virtual address specify an offset in a page table. Thus, the offset specified in the Table bits and the base address specified in the page directory table entry 711e may be used to reference an entry 711f in a page table such as table 710f. In page table 710f, each table entry, such as entry 711f, contains a base address of a page of physical memory, such as the 4 Kb page 720.

The Offset bits 11:0 in the virtual address specify an offset within a page of physical memory. Thus, the base address from entry 711f and the offset from the Offset bits can be concatenated to form the physical address 721. In this embodiment, 12 bits are used for the offset within each page of physical memory, so each page of physical memory can be $2^{12}$, or 4 Kb, in size. As will be explained in more detail with respect to FIG. 8B, different sizes of physical memory pages may be used in other embodiments.

Thus, the system shown in FIG. 7 uses 64 bits of the virtual address to navigate the paging tables 710 or as an offset within the resulting page. Because the paging system illustrated in FIG. 7 uses all 64 bits when accessing the various paging tables, it is able to map each 64-bit virtual address to a unique physical address.

As mentioned previously, it may not be desirable to fully implement 64-bit virtual addresses. Instead, some embodiments may implement virtual addresses utilizing less than the available 64 bits. FIG. 8A shows one embodiment of a paging system that may be used to map 48-bit virtual addresses to physical addresses. In FIG. 8A, 4 paging tables are used to translate memory addresses.

In some embodiments, such as the one illustrated in FIG. 8A, it may be desirable to require that virtual addresses be in a certain form in order to reserve unused bits for later implementation. For example, in some embodiments, virtual addresses implemented using less than 64 bits may be required to be in a "canonical" form. Canonical form may require that the unused bits be set to the same value as the most significant bit of the implemented address (e.g., bit 47 in this embodiment). Alternately, in other embodiments, the unused bits may be set to 1 or to 0. In embodiments where the form of the virtual addresses is restricted, software may be prevented from exploiting the unused upper bits of the pointers for other purposes. Software that complies with this form requirement and does not exploit bits that are unused in one implementation may then be able to run unchanged in a later implementation that supports more virtual address bits.

In order to enforce a form requirement, some embodiments may have a processor generate a general-protection exception or similar error signal if virtual addresses do not comply with the form requirement.

Thus, the upper bits 63:48 of the virtual address 801 in FIG. 8A are in canonical form. The next 9 bits 47:39 specify an offset within a level 4 table. In the illustrated example, the page directory base register 34, CR3, stores a pointer to the level 4 table 810a. Each entry in the level 4 table 810a contains a pointer to a page directory pointer table. The offset specified by bits 47:39 in the virtual address and the base address pointer from CR3 are used to identify the level 4 table entry 811a. The entry 811a contains the base address of page directory pointer table 810b.

The next set of bits 38:30 in the virtual address 801 describes an offset within a page directory pointer table 810b. Each entry in the page directory pointer table 810b contains a base address of a page directory table. In the illustrated embodiment, the offset specified in virtual address bits 38:30 and the pointer stored in the level 4 table entry 811a identify an entry 811b in page directory pointer table 810b. Entry 811b contains a pointer to the page directory table 810c.

The Directory bits 29:21 in the virtual address specify an offset within a page directory table 810c. Thus, this offset and the base address indicated by the page directory pointer table entry 811b may be used to locate an entry 811c in the page directory table 810c. The entries in the page directory table 810c may each contain a pointer to a page table. In this particular example, the entry 811c contains a pointer to the page table 810d.

Each entry in the page table 810d contains a pointer to a page of physical memory. The Table bits 20:12 of the virtual address specify an offset within page table 810d and, together with the base address specified in the page directory table entry 811c, locate an entry 811d in page table 810d. Page table entry 811d contains a pointer to a 4 Kb page 820 in physical memory. The offset bits 11:0 in the virtual address specify an offset within that page of physical memory, so these offset bits and the base address in the page table entry 811d can be concatenated to get the physical address 821.

Some embodiments of a paging system may map virtual addresses using various physical memory page sizes. For example, the embodiments illustrated in FIGS. 7 and 8A map virtual addresses to 4 Kb pages in physical memory. In contrast, the embodiment shown in FIG. 8B maps virtual addresses to 2 Mb pages in physical memory. Because the embodiment shown in FIG. 8B is mapping to larger pages, more virtual address bits may be used to specify the offset within the page of physical memory. Thus, in the particular embodiment of a paging system shown in FIG. 8B, 21 bits are used for the offset, allowing pages of physical memory to be $2^{21}$=2 Mb large. In this embodiment, 48-bit virtual addresses are used, and thus three equally sized paging tables are used to map the virtual addresses to physical addresses. Like the embodiment shown in FIG. 8A, this embodiment may implement the virtual addresses in canonical form. Similarly, the paging system shown in FIG. 8B operates in much the same way as the embodiment shown in FIG. 8A.

FIG. 8C shows an example of paging table entries that might be used in one embodiment of a paging system like the one shown in FIG. 8A. Generally, in addition to storing a pointer to another paging table or to a page of physical memory, each paging table may also store status information about the page or paging table being pointed to by the entry. Thus, in the entries shown in FIG. 8C, each entry contains several status bits or groups of bits.

In this embodiment, "G" is the global bit, which indicates whether or not the page is global. "A" is the accessed bit and indicates whether or not a page or page table has been accessed. "D" is the dirty bit, which indicates whether the page of physical memory has been written to or not. "PAT" is the page attribute table bit. "PCD" indicates whether the page or paging table can be cached or not. "PWT" indicates the caching policy of the page or page table. For example, PWT may indicate whether the write-through or write-back caching is enabled. "U/S" indicates the user/supervisor privileges for a page or, if the entry contains a pointer to a page table, a group of pages. "R/W" is the read/write flag that specifies the read/write privileges for the page or, if the entry contains a pointer to a page table, a group of pages. "P" is the present bit and indicates whether or not the page or page table currently resides in physical memory. If P indicates that the page or page table is not present in main memory, a page fault exception will be generated and the page will need to be retrieved from secondary storage. The "Available" bits may be available for software use in some embodiments. Generally, the embodiment shown may be compatible with older x86 entry definitions.

In some embodiments, some of the bits in the paging table entries shown in FIG. 8C may be reserved in order to allow the same system to be compatible with other implementations using a larger addressable physical memory. As the amount of addressable physical memory increases, more of the reserved bits may be used to specify physical addresses so that the paging tables and pages of physical memory can be located anywhere within the physical memory supported. For example, in some embodiments, each paging table entry may use all of bits 51:12 for the pointer to a paging table base address. However, in the embodiment shown, bits 39:12 are being used, and thus a 40-bit physical address is supported. Generally, any suitable physical address size may be supported by reserving an appropriate number of bits for physical addresses. In the illustrated embodiment, the reserved bits are set to zero (as indicated by the "Must Be Zero" or "MBZ" acronym in FIG. 8C).

Figure 8D:
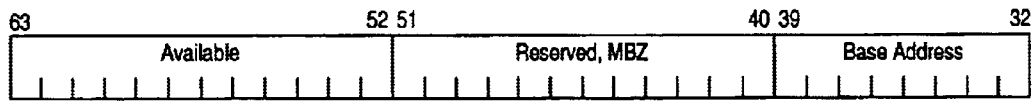
FIG. 8D is a block diagram of an embodiment of paging table formats that may be used in the paging system shown in FIG. 8B.
Figure 8D:
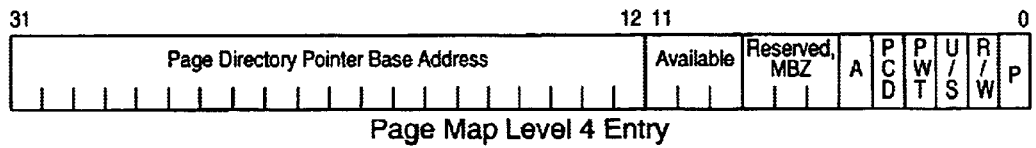
Figure 8D:
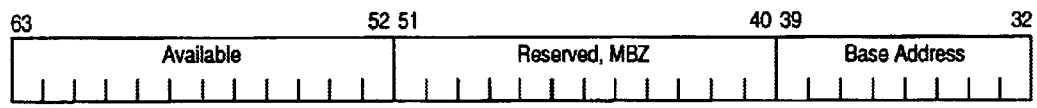
Figure 8D:
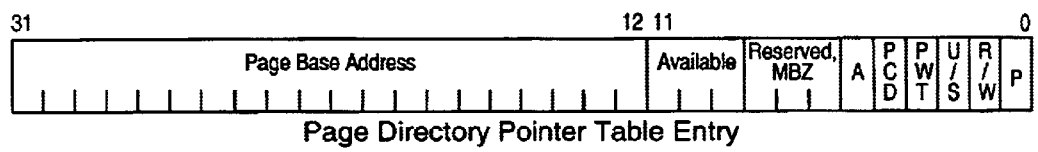
Figure 8D:
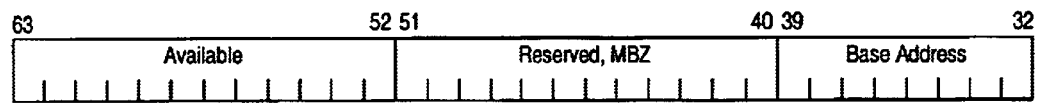
Figure 8D:
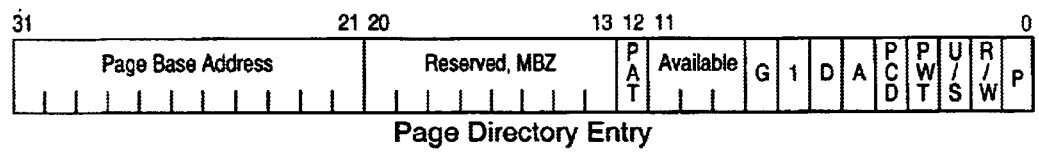

In one embodiment, setting a page size bit in a page directory entry may control the size of the pages (e.g., either 4 Kb or 2 Mb) in physical memory that the virtual addresses are mapped to. Thus, in such an embodiment, a page size bit equal to 1 may indicate that 2 Mb pages are being used and that the page directory entry contains a pointer to a base address of a page of physical memory. Likewise, a page size bit equal to 0 may indicate that the page directory entry contains a pointer to a page table and that 4 Kb pages are being used. This embodiment is illustrated in FIGS. 8C and 8D. In FIG. 8C, the page size bit is bit 7 in the page directory entry. Since the bit is set to 0, it indicates that 4 Kb pages are being used. In other embodiments, different bits with the page directory entry may be used, or a 0 may indicate 2 Mb pages while a 1 indicates 4 Kb pages. In still other embodiments, other registers may control the size of pages. For example, one or more bits in CR4 may control the page sizes in some embodiments.

FIG. 8D shows another example of paging table entries that might be used in one embodiment of a paging system such as is shown in FIG. 8B. Like the paging table entries shown in FIG. 8C, these entries may also store various status information about the page or paging table being pointed to by each entry. In this example, bit 7 of the page directory entry is the page size bit. Here, the page size bit is set to one to indicate that 2 Mb pages of physical memory are being used. Additionally, the G and D bits, which were used in the page table entry shown in FIG. 8C, are now used in the page directory entry since in this embodiment, the page directory entry contains a pointer to a page of physical memory instead of to another paging table.

In embodiments like those shown in FIGS. 7 and 8A–8D, the paging structures used for address translation may allow longer virtual addresses to be translated while still also supporting 32-bit virtual addresses. For example, in one embodiment, the lower 3 paging tables may be used to translate 32-bit virtual addresses and the page directory pointer table may be indexed with the most significant two bits of the 32-bit virtual address prepended with zeros.

Figure 9:
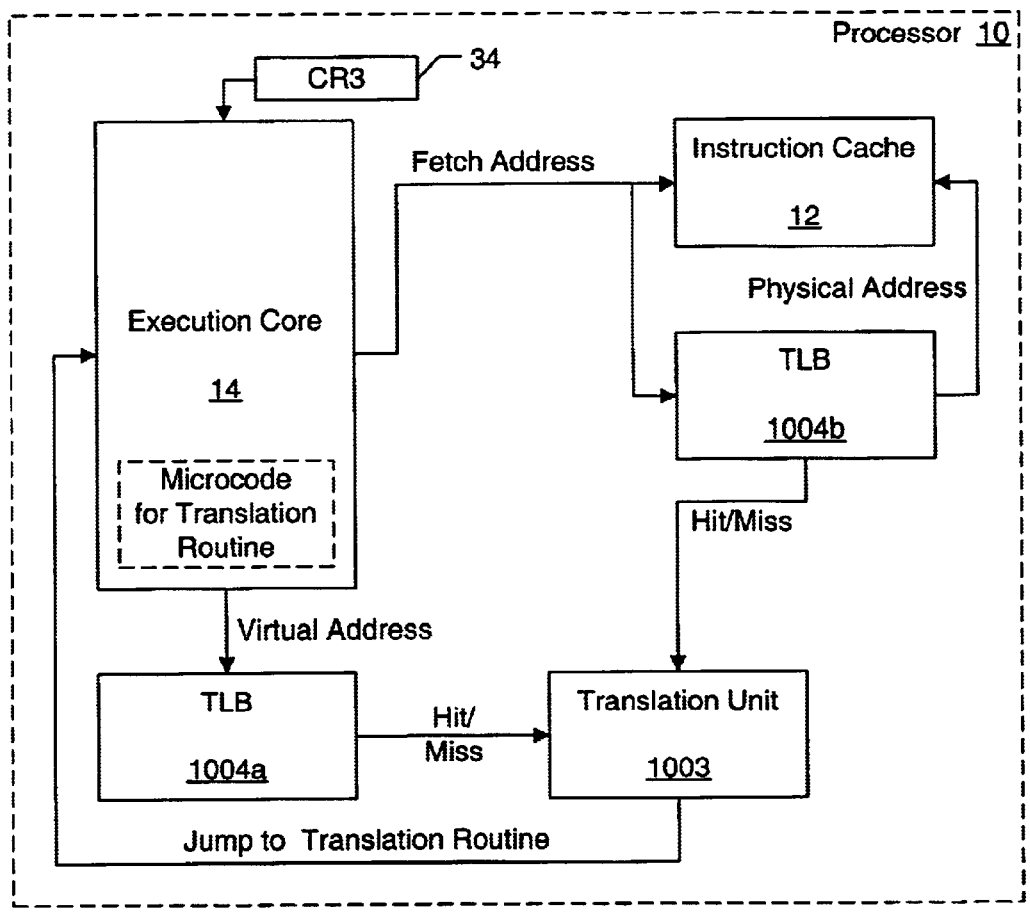
FIG. 9 illustrates a processor configured to translate virtual address to physical addresses, according to one embodiment.

FIG. 9 shows one embodiment of a processor 10 configured to use a paging system like the embodiments illustrated in FIGS. 7–8. Processor 10 may include an execution core 14, an instruction cache 12, a translation unit 1003, and several translation lookaside buffers 1004 (TLBs). The TLBs 1004a–1004b may be configured to cache recently translated addresses. For example, the tag of a TLB 1004a may hold a portion of a recently-translated virtual address and the data portion may hold a physical page number and other status information for the physical page that results from traversing through the various page tables such as those shown in FIGS. 7–8. In one embodiment, the data portion of a TLB entry may be the same as a corresponding paging table entry. In the illustrated embodiment, different TLBs 1004 are used for the instruction and the data caches.

Processor 10 may also include a page directory base register 34, CR3. In one embodiment, the number of bits in CR3 may be chosen to allow the first level of the paging tables to be located anywhere in the addressable physical memory. Furthermore, certain bits within CR3, such as the lowermost 12 bits, may be assumed to be zero in order to force the first level paging table to be aligned with a certain boundary, such as a 4 Kb boundary.

The execution core may be configured to generate a virtual address and a fetch address. The fetch address is presented to the instruction cache and translation lookaside buffer 1004b. If the fetch address has been recently translated, a valid translation for it may be cached in TLB 1004b and it will generate a hit. Otherwise, presenting the fetch address to TLB 1004b will generate a miss. Similarly, virtual addresses for data are generated by the execution core and presented to TLB 1004a. If a virtual address has been recently translated, and thus a valid translation is cached in TLB 1004a, TLB 1004A generates a TLB hit. If not, TLB 1004A generates a miss.

If there is a TLB hit, the virtual address may be translated using the TLB entry. Thus, the physical address may be obtained by concatenating the base address stored in the TLB entry with a physical page offset contained in the virtual address. If there is a TLB miss, however, a paging system such as those illustrated in FIGS. 7 and 8A–8D may be used to translate the address. Thus, the translation unit 1003 may, in some embodiments, cause execution core 14 to jump to a translation routine. In such an embodiment, the translation routine may be implemented in microcode within execution core 14. The translation routine may read CR3 and extract an appropriate field of the virtual address bits to locate an entry in the topmost paging table. The translation routine may then successively read pointers from paging table entries and extract other fields from the virtual address bits to traverse the set of paging tables and arrive at a physical address. In some embodiments, either the processor or the operating system may also be configured to replace an entry (e.g., a least recently used entry) in a TLB with a new entry corresponding to a just-translated virtual address that was not already represented in the TLB. Furthermore, other embodiments may implement the translation mechanisms that traverse the paging tables in hardware such as translation unit 1003.

Figure 10:
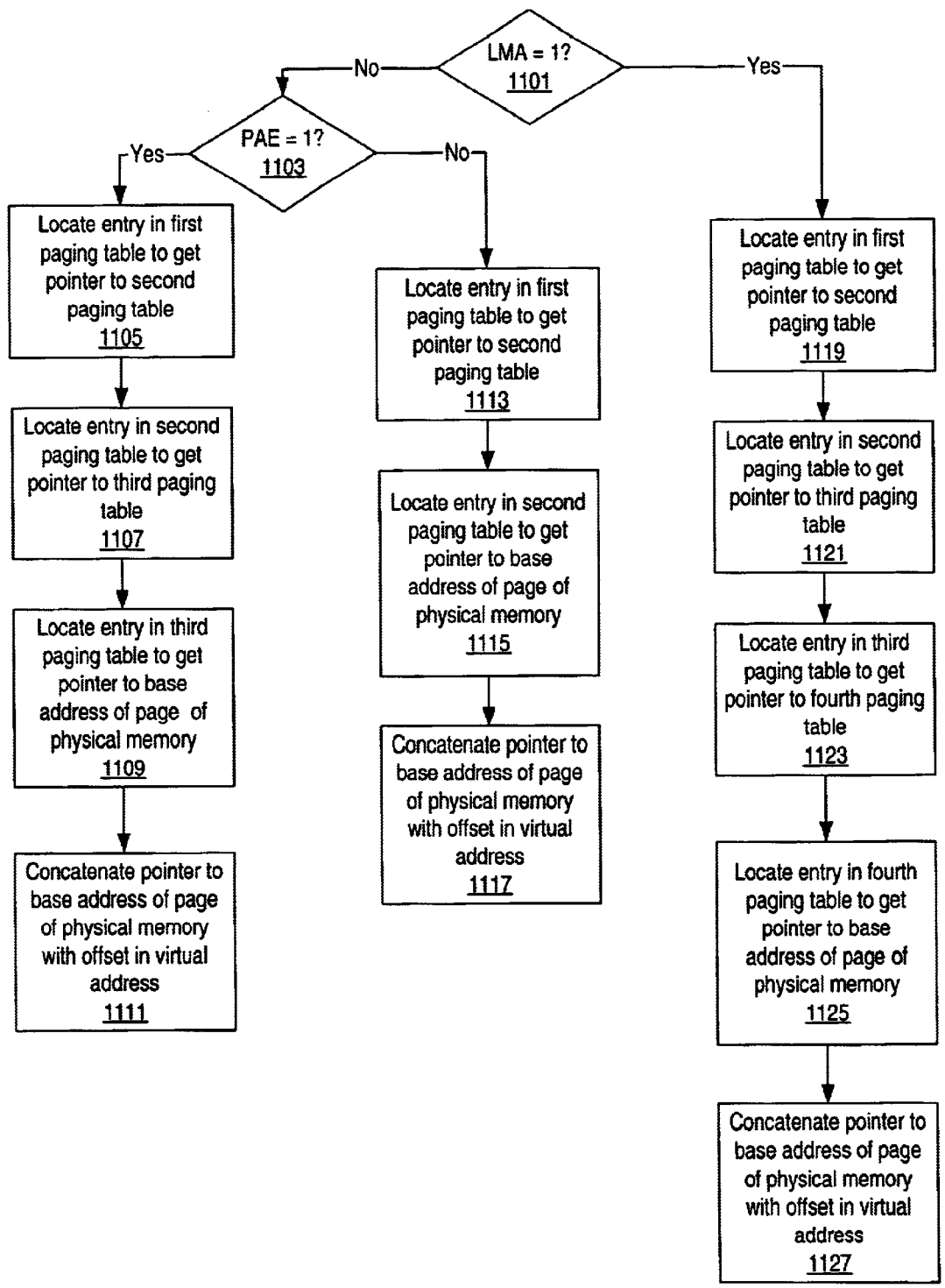
FIG. 10 illustrates one embodiment of a method of translating virtual addresses to physical addresses.

FIG. 10 illustrates one embodiment of a method for translating virtual addresses to physical addresses using multiple page mapping mechanisms. The flowchart of FIG. 10 may be implemented in a translation microcode routine, in hardware, or in a combination of both, as desired.

In the illustrated embodiment, virtual addresses may be translated using one of three page mapping mechanisms. In one embodiment, two of the page mapping mechanisms may provide compatibility with the x86 processor architecture and another page mapping mechanism may support 48-bit processing. Accordingly, steps 1105–1111 may correspond to a paging mechanism such as the one shown in FIG. 2A, steps 1113–1117 may correspond to a paging mechanism such as the one shown in FIG. 1, and steps 1119–1127 may correspond to the page mapping mechanism shown in FIG. 8A. In a page mapping mechanism that supports 48-bit processing, four levels of paging tables may be used to translate a virtual address to a physical address. However, in other embodiments that support up to 64-bit virtual addresses, additional or fewer levels of paging tables may be used (e.g., as shown in FIGS. 7 and 8B).

The page mapping mechanism used for a particular translation may be selected by setting operating mode indicators. For example, the LMA bit in control register 26 may be used to indicate whether a processor is in long mode (i.e., a mode that supports 64-bit processing). In long mode, the default address size may be greater than 32 bits (depending on code segment selector settings, in one embodiment), and thus when the processor is in long mode, a page mapping mechanism like the one shown in FIG. 8A may be used to translate virtual addresses. In some embodiments, virtual addresses having 32 bits may also be supported in long mode. For example, the compatibility modes shown in FIG. 6 may be supported. In these modes, virtual addresses may be prepended with zeros or extended in canonical form to provide index bits for each of the tables in FIG. 8A.

Figure 2A:
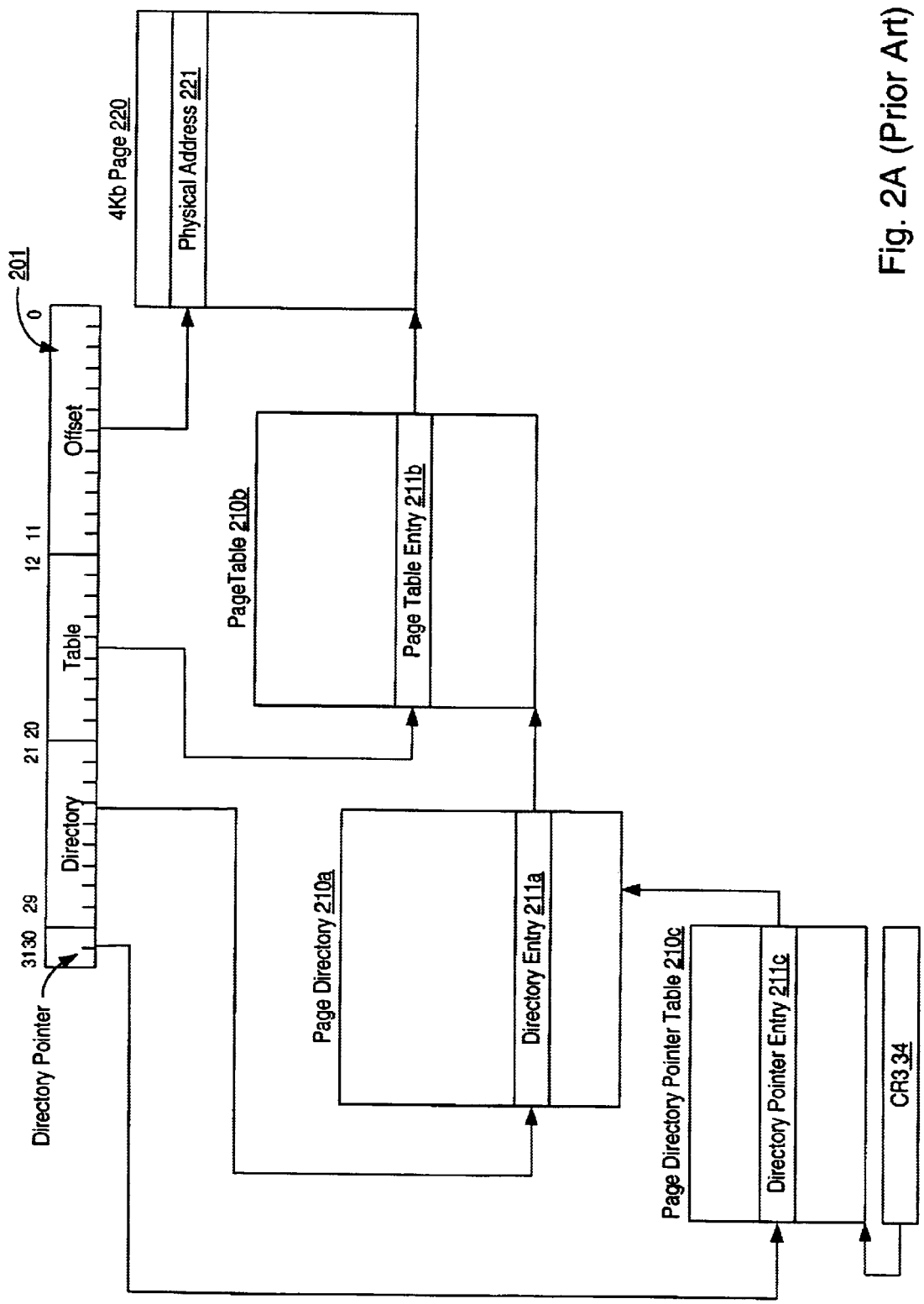
FIG. 2A is a block diagram of another prior art paging system.
Figure 2B:
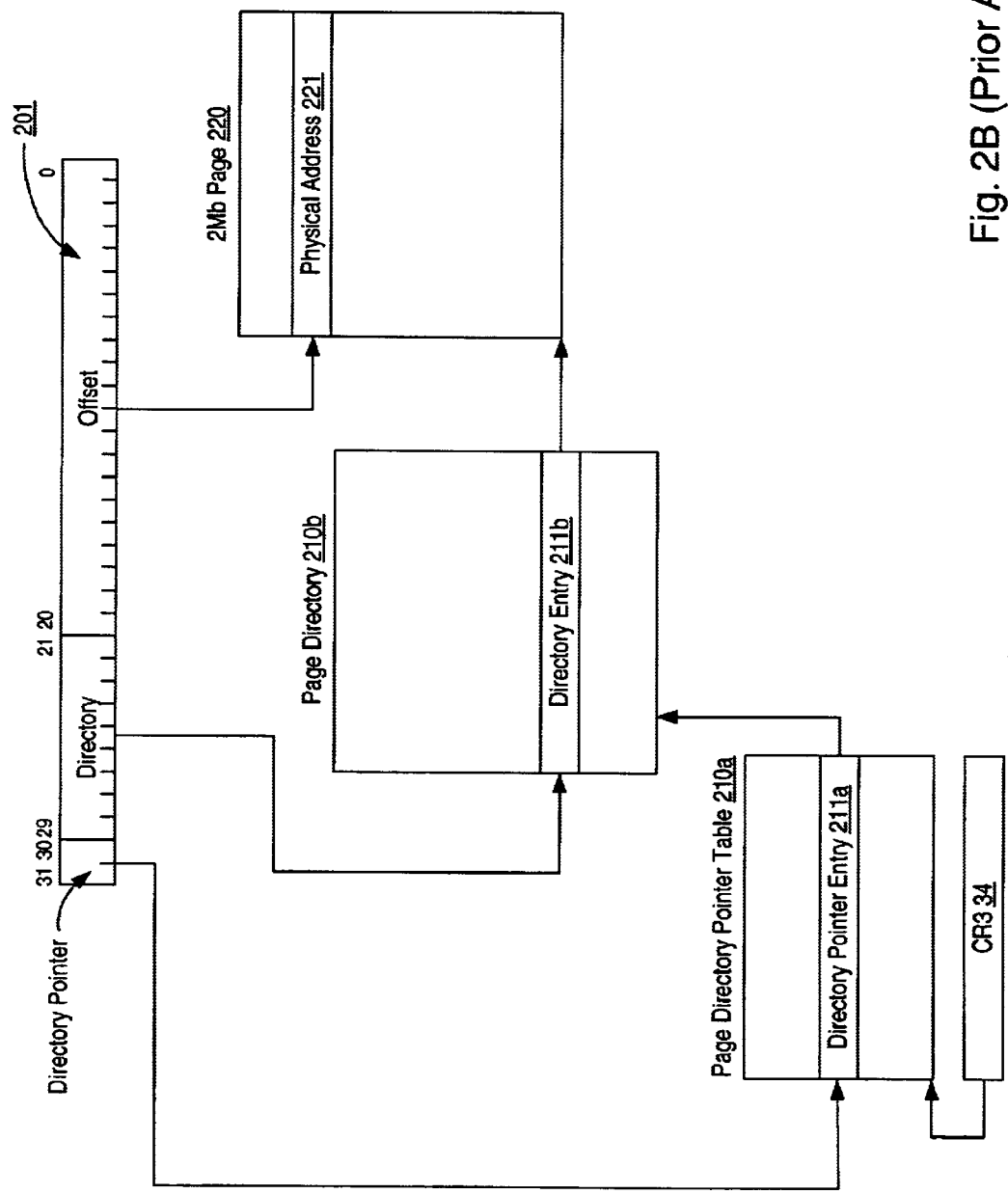
FIG. 2B is a block diagram of yet another prior art paging system.

If the processor is not in long mode, the page mapping mechanisms of FIG. 1, 2A, or 2B may be used. When the processor is in an x86-compatible mode (as opposed to long mode), a PAE (physical address extension) indication may be used to indicate whether the default physical address size is 32 or 36 bits. In one embodiment, the PAE bit may be a bit in one of the control registers (e.g., control register 26). If the PAE bit is set, the default physical address size may be 36 bits. Accordingly, paging tables like those shown in FIG. 2A or 2B may be used to translate virtual addresses while in this mode. Alternately, if the PAE bit is cleared, the default physical address size may be 32 bits and paging tables such as those shown in FIG. 1 may be used. Note that in other embodiments, one or more of the page mapping mechanisms may each support different default physical address sizes.

By providing several different sets of paging tables, the illustrated method may provide both support for 64-bit processing and compatibility with the x86 processor architecture. For example, a processor may provide compatibility with the x86 when in "legacy mode" (e.g., when the LMA bit is not set). In legacy mode, a processor may use sets of paging tables like those shown in FIGS. 1, 2A, and 2B. Alternately, when operating in long mode, the same processor may use sets of paging tables like those shown in FIGS. 7, 8A and 8B. In this way, legacy mode software may be executed on the same processor as software that takes advantage of the greater virtual address size supported by the page mapping mechanisms of FIGS. 7, 8A, and 8B.

The various page mapping mechanisms used with the method shown in FIG. 10 may share similar characteristics. For example, the paging tables used in steps 1119–1127 may have the same size entries as the paging tables used in steps 1105–1111. Thus, within both sets of paging tables, page table entries may be 8 bytes in size. In contrast, the paging tables used in steps 1113–1117 may use 4 byte entries (e.g., if the page mapping mechanism of FIG. 1 is being used).

Some of the paging tables within the various sets of paging tables may also be indexed using the same range of virtual address bits. For example, the lower 2 paging tables (Page Directory Table and Page Table) in FIG. 7 may be indexed using the same range of virtual address bits (29:12) as is used to index the paging tables (Page Directory Table and Page Table) in FIG. 2A.

Returning to the flowchart of FIG. 10, in block 1101, if the processor has more than one operating mode, the operating mode may be determined by looking at an indication such as the LMA bit. If the operating mode is long mode (e.g., the LMA bit is set to 1), the page mapping mechanism of FIG. 7, 8A, or 8B may be used. Thus, an entry within a first paging table is located using a pointer to a base address of that table and an offset within the virtual address, as shown at block 1119. For example, in one embodiment, the pointer to the base address may be stored in a register such as CR3 and the offset may be within the highest order implemented bits of the virtual address. The entry located using the base address pointer and the offset comprises a pointer to a second paging table. In one embodiment, the entry may be similar to the level 4 entry shown in FIG. 8C. Note that in other embodiments, such as those where compatibility with pre-existing software is not supported, only one page mapping mechanism may be supported.

At block 1121, the pointer to the second paging table and a second offset in the virtual address may be used to locate an entry within the second paging table. The second paging table entry may be similar to the page directory pointer entry shown in FIG. 8C in one embodiment. The entry located at block 1121 comprises a pointer to a third paging table. Similarly, at block 1123, the pointer to the third paging table and a third offset within the virtual address may be used to locate an entry within the third paging table. This entry may be similar to the page directory entry shown in FIG. 8C and may include a pointer to a fourth paging table. Using the pointer to the fourth paging table and a fourth offset in the virtual address, an entry in a fourth paging table is located at block 1125. This entry may be configured similarly to the page table entry shown in FIG. 8C and may comprise a pointer to a base address of a page of physical memory. The pointer to the base address and a fifth offset in the virtual address may then be concatenated in an order necessary to generate the physical address corresponding to the virtual address.

While the embodiment illustrated in the flowchart has 4 levels of page tables, other embodiments may have five or six levels. For example, the embodiment of FIG. 7 includes six levels. The flowchart of FIG. 10 may be expanded to include locating pointers in the fifth and sixth levels for such embodiments.

If the processor is not in long mode (e.g., the LMA bit is cleared), one of the other page mapping mechanisms may be used. For example, if the default physical address size is 36 bits (e.g., PAE=1), a page mapping mechanism like that shown in FIG. 2A may be used (blocks 1105–1111). Similarly, if the default physical address size is 32 bits (e.g., PAE=0), the paging mechanism used may be like the one illustrated in FIG. 1 (blocks 1113–1117).

Blocks 1105–1111, 1113–1117, and 1119–1127 illustrate translations for 4 kb page sizes. However, page sizes of 4 Mb (PAE=0) or 2 Mb (PAE=1) may also be supported. For example, a bit in the page directory entry (e.g. bit 7 in the embodiments illustrated in FIGS. 8C and 8D) may indicate whether the page is 4 kb or the larger page size (which is either 4 Mb or 2 Mb dependent on the PAE bit). If the larger page size is in use, blocks 1109, 1115, and 1125 may be skipped and the pointer obtained in blocks 1107, 1113, and 1123 (respectively) may be the pointer to the physical page.

Figure 11:
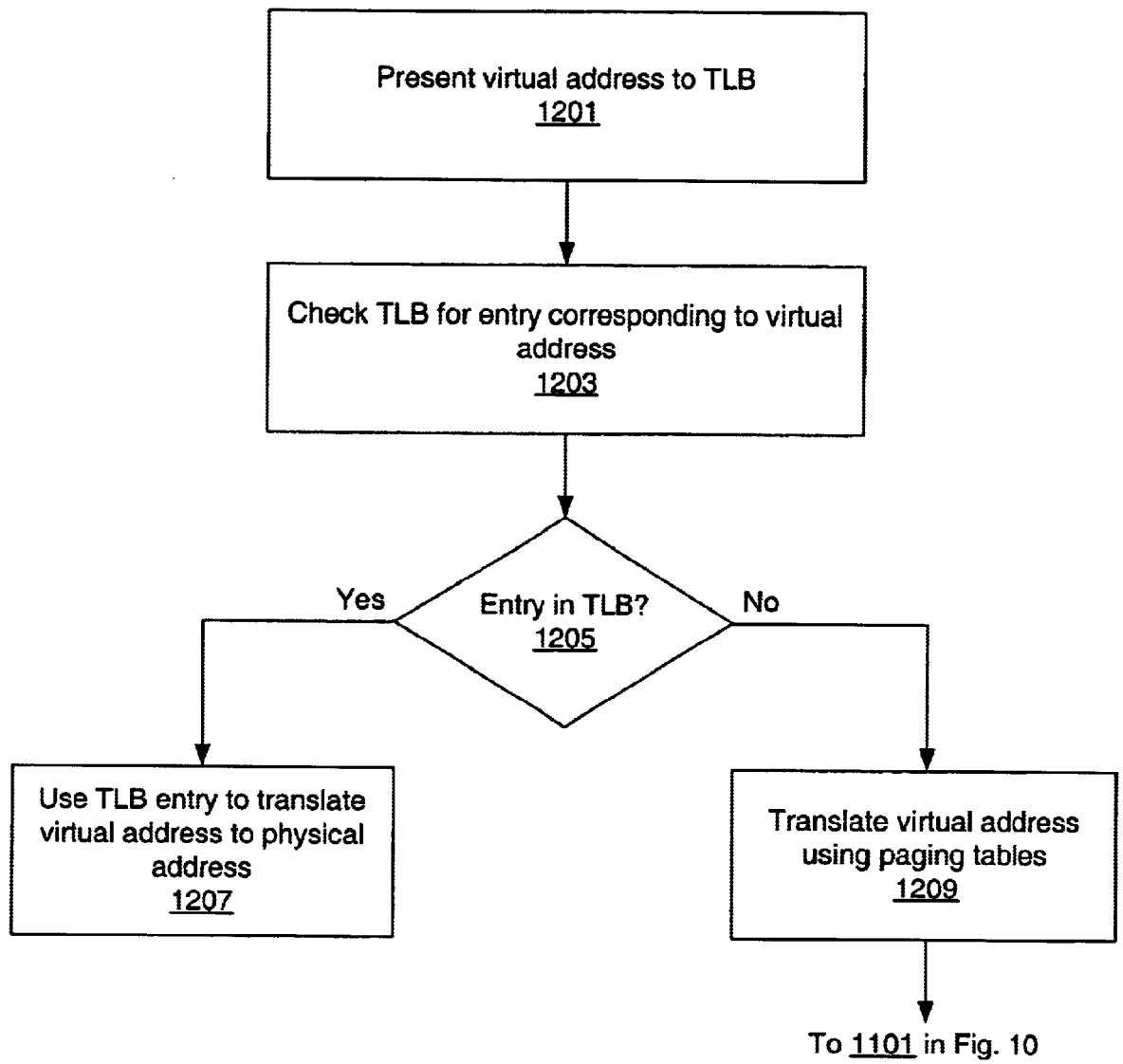
FIG. 11 illustrates another embodiment of a method of translating virtual addresses to physical addresses.

FIG. 11 illustrates another embodiment of translating virtual addresses to physical addresses using multiple paging tables and translation lookaside buffers (TLBs). In this embodiment, virtual addresses are presented to a TLB. If an entry corresponding to a virtual address is present in the TLB, the translation contained in that TLB entry may be used to generate the physical address, as shown at block 1207. If no corresponding entry is present, paging tables such as those shown in FIGS. 7, 8A, and 8B may be required to perform the translation. Thus, in some embodiments, a TLB miss may cause the translation process to jump to block 1101 shown in FIG. 10.

Software Embodiments

While the above description may generally have described a processor that may directly support, in hardware, the processor architecture having the features described above, it is contemplated that other processor embodiments may not directly implement the processor architecture. Instead, such embodiments may directly implement a different processor architecture (referred to below as a native processor architecture, which may define a native instruction set including native instructions). Any native processor architecture may be used. For example, the MIPS (a registered trademark of MIPS Technologies, Inc.), POWERPC (a registered trademark of International Business Machines Corp.), Alpha, SPARC (a registered trademark of Sparc International, Inc.), ARM (a registered trademark of ARM Limited), etc. architectures may be used. The processor architecture may be implemented in software executing on the native processor architecture in a variety of fashions, using any native processor architecture such as, for example, the CRUSOE (a registered trademark of Transmeta Corporation) products.

Generally, a processor embodiment implementing a native processor architecture different than the processor architecture described above (referred to below as the non-native processor architecture) may support the non-native processor architecture in a variety of fashions. For example, such a processor embodiment may execute interpreter software that reads each non-native instruction in a non-native code sequence as data, and executes various software routines that emulate the defined operation of the non-native instruction as defined in the non-native processor architecture. Alternatively, translator software may be executed. The translator software may translate the non-native instructions in the code sequence to an equivalent set of native instructions defined by the native instruction set architecture. The native code sequence may be stored in memory, and may be executed instead of the corresponding non-native code sequence. In yet another alternative, a mixture of interpretation and translation may be used. For example, the code sequence may be interpreted, but the interpreter may also generate statistics about which parts of the code sequence are being most frequently executed. The most frequently executed portions may then be translated to native code sequences.

In any of the above methods, the architected state defined by the non-native processor architecture may be maintained by the combination of the processor and the software (interpreter or translator) in a variety of fashions. For example, the non-native architected state may be mapped to memory locations in a memory addressable by the processor, to general registers defined by the native processor architecture (by software convention, either in the interpreter or in the translator), or the processor may directly support the non-native architected state by defining registers or other storage hardware within the processor that corresponds to the non-native architected state. The non-native architected state may be stored using any combination of the above methods, as desired.

Generally, the architected state includes any state defined to exist by the architecture. For example, in the embodiment described above, the non-native architected state may include general registers (e.g., RAX, RBX, etc.), segment registers, control registers, other registers such as the model specific registers (MSRs), etc. Additionally, the architected state may include data structures defined for the operating system to create, such as the descriptor tables, page tables, task state segments, etc.

Figure 12:
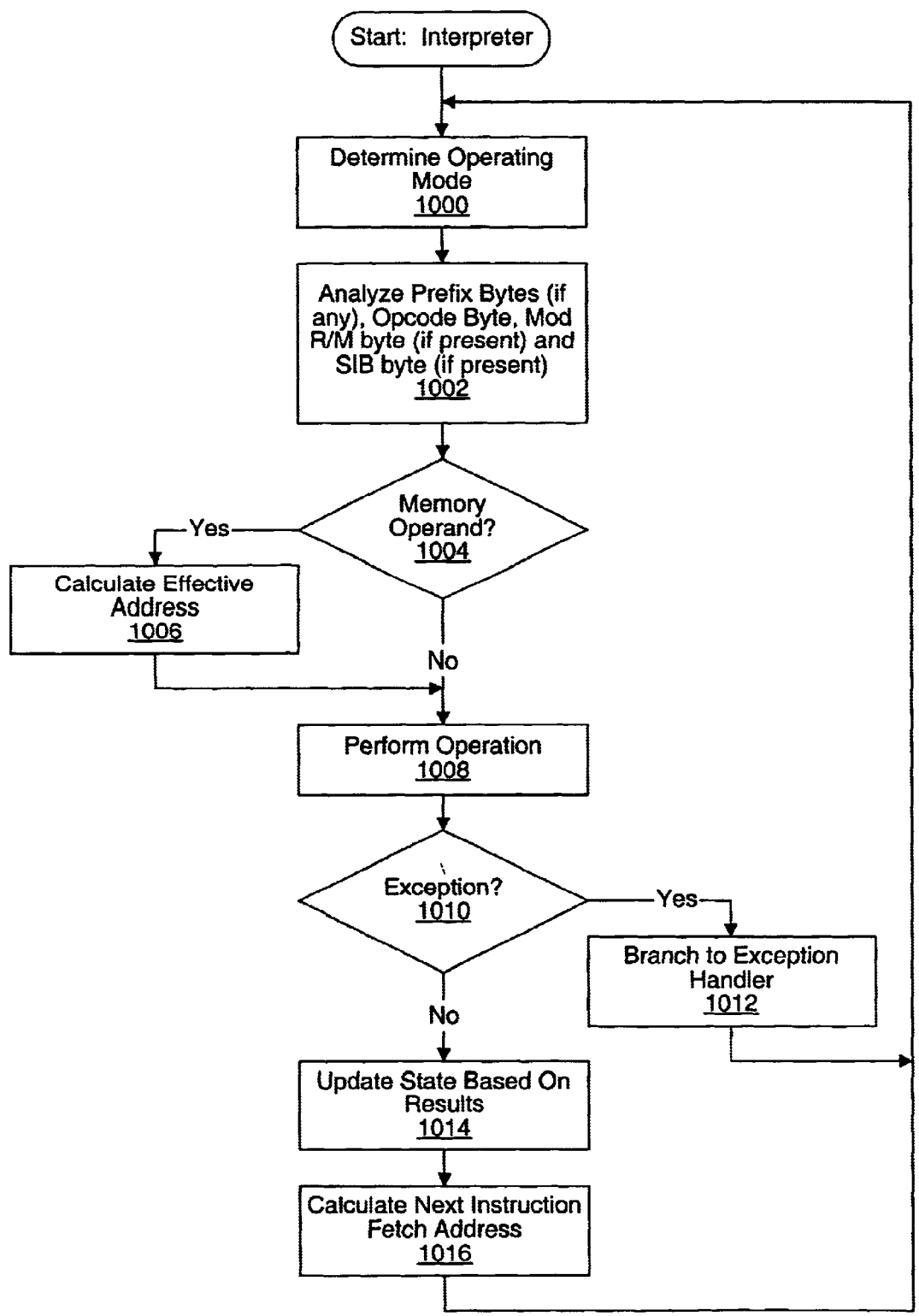
FIG. 12 is a flowchart illustrating one embodiment of an interpreter.

Turning to FIG. 12, a flowchart illustrating an exemplary interpreter that may be used to interpret non-native instructions is shown. Other embodiments are possible and contemplated. While the blocks shown are illustrated in a particular order for ease of understanding, any suitable order may be used. Furthermore, blocks may be performed in parallel, as desired.

The blocks shown in FIG. 12 illustrate the emulation of one non-native instruction. Generally, the interpreter may execute the blocks shown in FIG. 12 for each non-native instruction to be executed according to the non-native code sequence to be executed.

The interpreter may determine the operating mode for the non-native instruction (block 1000). As described above, the operating mode may be determined from the LMA bit in control register 26 and the L bit and D bit from the code segment descriptor indicated by the CS segment register. The operating mode may be determined anew from the LMA, L bit, and D bit for each non-native instruction, or the resulting operating mode may be stored in a temporary register for access by the interpreter for each non-native instruction. If the resulting operating mode is stored, the interpreter may update the stored operating mode if an instruction modifies the CS segment register or interrupt or exception handling causes the operating mode to change. As mentioned above, the CS segment register and the control register(s) (which are part of the non-native architected state) may actually be memory locations, general registers, or special purpose registers, or any combination thereof.

The interpreter may read the current non-native instruction from memory, and may analyze the non-native instruction to determine the operations to be taken to emulate the non-native instruction (block 1002). The interpreter may read the non-native instruction one byte at a time, or may read a suitable set of consecutive bytes and process the bytes. For example, a native processor architecture in which operands are 32-bit may read 32 bits (4 bytes) of the non-native instruction at a time, and then may process the four bytes before reading any additional bytes.

Generally, the interpreter software may decode the non-native instruction in a manner analogous to processor 10 decoding the instruction in hardware. Thus, for the illustrated non-native processor architecture, which is compatible with the x86 processor architecture, the analyzing of the non-native instruction includes analyzing any prefix bytes which may precede the opcode byte, analyzing the opcode byte, analyzing the addressing mode (Mod R/M) byte (if present), and analyzing the scale-index-base (SIB) byte (if present). Prefix bytes may override the operating mode, and may also include register specifier bits (e.g., the REX prefix byte). The opcode byte specifies the operation to be performed, and in some cases may include a register specifier or may implicitly specify an operand (e.g., the stack or the stack pointer). The Mod R/M byte specifies operands (including any displacement or immediate operands which may follow the Mod RIM byte or the SIB byte, if the SIB byte is present) and may include register specifiers. Finally, the SIB byte may include register specifiers. From the information gained from analyzing the non-native instruction, the interpreter has the information to emulate the non-native instruction (including operating mode for the non-native instruction, which specifies the operand size and address size of the non-native instruction, operands, the operation to be performed, etc.).

If the non-native instruction includes a memory operand (determined in decision block 1004), the interpreter may calculate the effective address of the instruction (block 1006). If the non-native instruction has a memory operand, some of the operands identified in block 1002 may be address operands used to generate the effective address. Thus, the interpreter may read the address operands from the non-native architected state and may add them to generate an effective address. The size of the effective address may be determined by the address size for the instruction, as determined at blocks 1000 and 1002. It is noted that the native processor architecture may support an address size that is less than the address size supported by the non-native processor architecture. For example, in one exemplary embodiment described above, the virtual address size may be 48 bits in 32/64 mode. The native processor may, for example, support a virtual address size of 32 bits. In such an embodiment, block 1006 may represent a series of calculations in which the least significant bits (e.g., 32 bits) of the virtual address may be calculated, and any carry from the least significant bits may be carried into a calculation of the most significant bits of the virtual address.

The interpreter may then perform the operation specified by the non-native instruction (block 1008). If the non-native instruction includes a memory operand as a source operand, the interpreter may read the memory operand from the effective address calculated at block 1006. Other operands may be read from the non-native architected state. The operation may include an arithmetic operation, a logical operation, a shift, a move to another storage location, etc. The native processor architecture may support an operand size smaller than the operand size of the instruction. In such cases, performing the operation may include multiple calculations on portions of the operand to calculate the result.

The interpreter may determine if the non-native instruction resulted in an exception (decision block 1010). Generally, exceptions may occur throughout the execution of the operations specified by the non-native instruction. For example, accessing a source memory operand may result in a page fault before any of the actual instruction operation is performed. During the operations, various architecturally-defined exceptions may also occur. The interpreter may interrupt processing of the non-native instruction upon detecting an exception, and may branch to exception handler instructions (block 1012). The exception handler may be native code or non-native code, as desired. If the non-native processor architecture specifies the update of any architected state when an exception is taken (e.g., various control registers may store the address of the exception causing instruction, the exception reason, etc.), the interpreter may update the non-native architected state as defined.

It is noted that the interpreter software is executing on the native processor, and thus is subject to experiencing exceptions as defined in the native processor architecture. These exceptions may generally be different than the exceptions detected by the interpreter software, which are exceptions experienced by the non-native code being interpreted according to the non-native processor architecture.

If no exception occurs during emulation of the non-native instruction, the interpreter may update the non-native architected state according to the definition of the non-native instruction (block 1014). Finally, the interpreter may calculate the next non-native instruction fetch address to fetch the next instruction (block 1016). The next fetch address may be sequential to the current non-native instruction, or may be a different address (e.g., if the current non-native instruction is a taken branch, the next fetch address may be the target address of the branch instruction).

It is noted that the interpreter may operate in protected mode, using virtual addresses. In other words, the effective address calculated at block 1006 may be a virtual address that is translated by the translation mechanism specified by the non-native processor architecture to a physical address. The processor may include a translation lookaside buffer (TLB) used to cache translations. The processor may either support reload of the TLB from the non-native translation tables (page tables), or may take an exception on a TLB miss to allow software reload of the TLB.

Generally, the interpreter may perform the flowchart of FIGS. 10 and/or 11 at any suitable point in the processing of instructions (e.g., block 1006) for data addresses or as part of fetching an instruction for instruction addresses, depending on the instruction. Furthermore, FIG. 11 may be implemented in hardware in the non-native processor.

Figure 13:
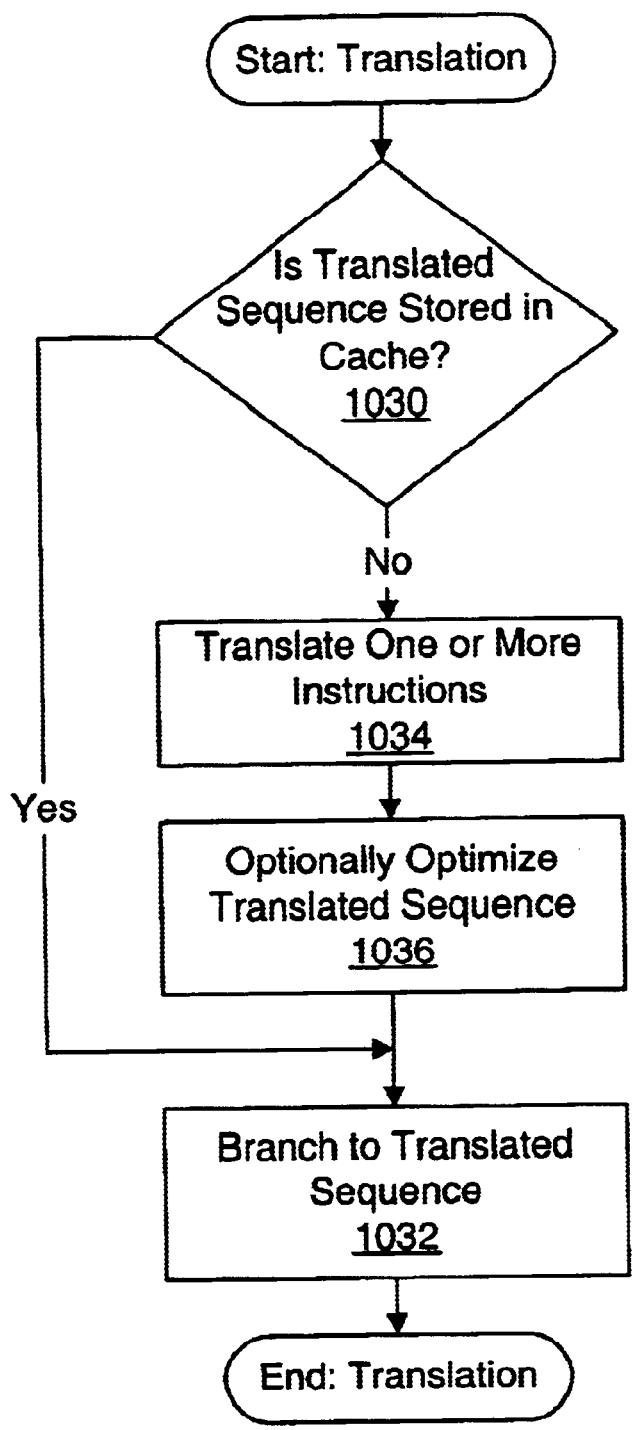
FIG. 13 is a flowchart illustrating one embodiment of a translator.

Turning to FIG. 13, a flowchart illustrating an exemplary translator that may be used to translate non-native instructions in the non-native processor architecture to native instructions in the native processor architecture. Other embodiments are possible and contemplated. While the blocks shown are illustrated in a particular order for ease of understanding, any suitable order may be used. Furthermore, blocks may be performed in parallel, as desired.

The blocks shown in FIG. 13 illustrate the translation of one non-native code sequence responsive to a fetch address for the first instruction in the non-native code sequence. The code translator may translate any number of non-native instructions to produce a translated code sequence having native instructions. For example, the translator may translate from the initial non-native instruction to a basic block boundary (i.e. a branch instruction). Alternatively, the translator may speculatively translate two or more basic blocks or may translate up to a maximum number of non-native or resulting native instructions, if desired.

Generally, the translator may maintain a translation cache which stores translated code sequences previously produced by the translator. The translation cache may identify translated code sequences by the fetch address of the first non-native instruction in the corresponding non-native code sequences. Thus, the translator may determine if a translated code sequence corresponding to the fetch address is stored in the translation cache (decision block 1030). If there is a translated code sequence in the translation cache, the translator may cause the processor to branch to that translated code sequence (block 1032). On the other hand, if there is no translated code sequence stored in the translation cache, the translator may translate one or more non-native instructions from the non-native code sequence into native instructions in a translated code sequence (block 1034).

Generally, the translator may translate each non-native instruction into one or more native instructions that, when executed, may perform the same operation on the non-native architected state that the non-native instruction would have performed. The translator may generally perform the same decoding of instructions as is performed by the interpreter (block 1002 in FIG. 12) to determine what operations may need to be performed. For example, if the native processor architecture is a load/store architecture in which memory operands are accessed using explicit load/store instructions and other instructions use only register operands, load and store instructions may be used to access the memory operands and other instructions may be used to perform the explicit operation of a non-native instruction having a memory operand. The translated instructions may make use of temporary registers to hold intermediate values corresponding to the execution of the non-native instruction. Additionally, the translated instructions may access the non-native architected state to retrieve operands and may update the non-native architected state with the final results of the non-native instruction. Generally, the native instructions corresponding to the non-native instruction may perform all of the operations defined for the instruction (e.g. blocks 1006, 1008, 1010, 1014, and 1016 in FIG. 12).

Once the translator has determined to terminate translation and save the translated sequence for execution, the translator may optionally optimize the translated code sequence (block 1036). The optimizations may include reordering the translated instructions for quicker execution, eliminating redundancies (e.g., redundant memory references, which may occur if multiple non-native instructions in the source code sequence accessed the same memory location), etc. Any suitable set of optimizations may be used. The resulting translated code sequence may then be stored into the translation cache. Additionally, the processor may branch to the translated code sequence and execute the sequence (block 1032).

It is noted that, while the above description may refer to accessing and/or updating a non-native architected state, including various registers, the non-native architected state may be stored in any suitable fashion. For example, architected registers may actually be stored in memory locations, as highlighted above. The mapping of architected registers from the non-native processor architecture to memory locations may be used in either of the interpreter or the translator embodiments, or combinations thereof, to locate the non-architected state used during execution of the non-native instruction or affected by the execution of the non-native instruction. Thus, instructions which access the non-native architected state may perform memory reads/writes or register reads/writes, as the case may be.

Figure 14:
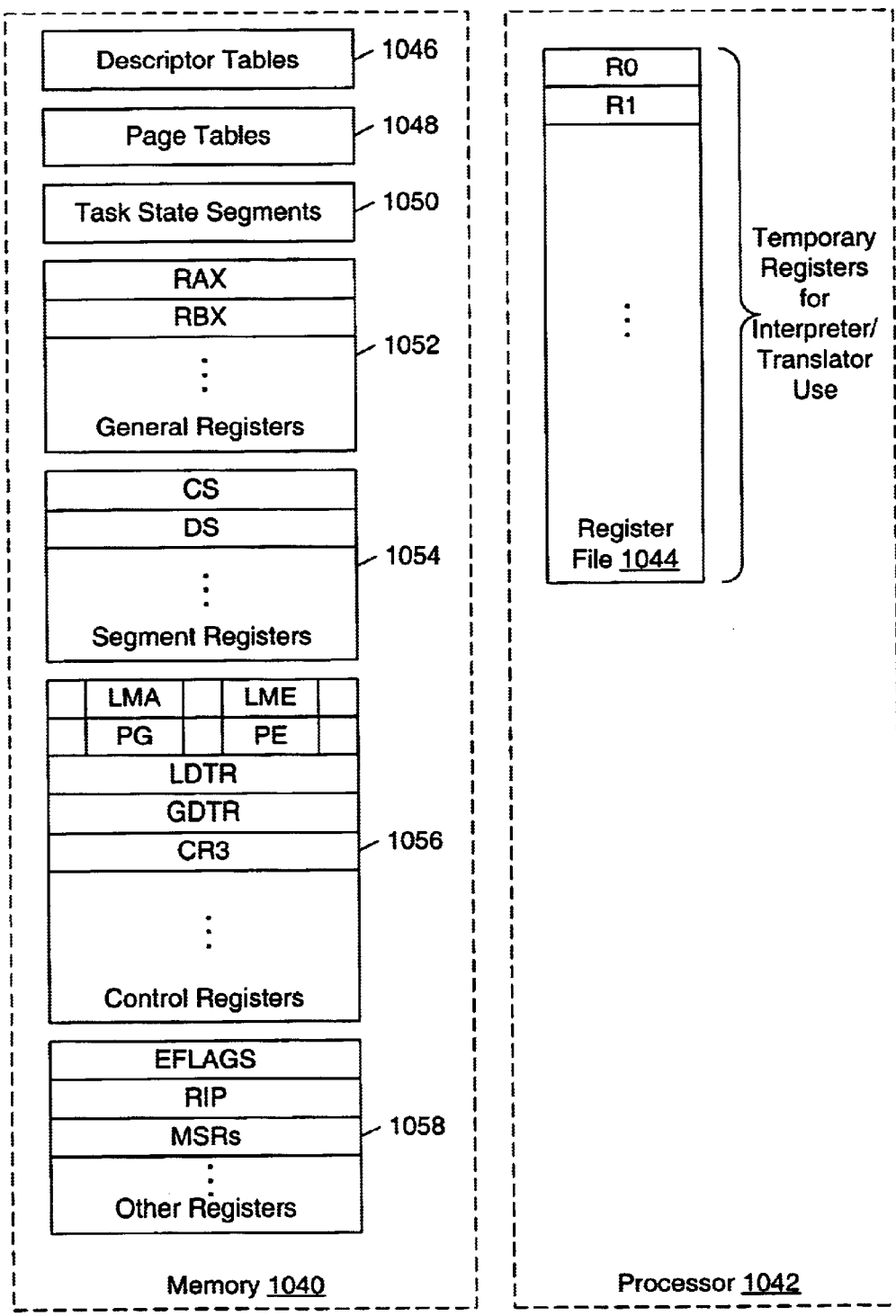
FIG. 14 is a block diagram illustrating one embodiment of the mapping of a non-native architected state.

Turning next to FIG. 14, a block diagram illustrating one exemplary mapping of a non-native architected state to either memory locations in a memory 1040 or to processor resources in a native processor 1042. Native processor 1042 includes a register file 1044 including the architected general registers of the native processor architecture. Any number of registers may be provided.

In the embodiment of FIG. 14, all of the non-native architected state is mapped to memory 1040. For example, descriptor tables 1046 (which may include a global descriptor table, a local descriptor table, and an interrupt descriptor table), page tables 1048 (which store virtual to physical address translations), task state segments 1050, general registers 1052, segment registers 1054, control registers 1056, and other registers 1058 may represent a non-native architected state. Depending on the particular embodiment, the page tables 1048 stored in memory 1040 may be similar to those illustrated in FIGS. 7 and 8A–8D.

Thus, in the embodiment of FIG. 14, to access any non-native architected state, a memory access may be performed. For example, if a non-native instruction has one of the general registers as an operand, the interpreter or translated native instruction performs a memory access to the memory location mapped to that general register to access or update that general register. The registers in register file 1044 may be used by the interpreter or translator as temporary registers to hold intermediate results or for other local interpreter/translator states.

General registers 1052 may include integer general registers (e.g. RAX, RBX, etc. as described above), the additional integer general registers defined by the REX prefix byte, floating point registers, Streaming Single Instruction, Multiple Data (SIMD) Extension (SSE) registers, and the additional SSE registers defined by the REX prefix byte.

Segment registers 1054 may include storage locations corresponding to the segment registers 24 shown in FIG. 3 above.

Control registers 1056 may include storage locations corresponding to various control registers defined in the non-native processor architecture. For example, control registers storing the LMA, LME, PG and PE bits, as well as the LDTR and GDTR registers and the CR3 register (which stores the base address of the page tables 1048) are shown. Other control registers may be included as well.

Other registers 1058 include any remaining architected registers. For example, the EFLAGS register (which stores condition code information), the instruction pointer (RIP) register (which stores the address of the instruction to be executed), and the model specific registers (MSRs) may be included in other registers 1058.

The floating point instruction pointer and data pointer registers may be included in any of registers 1052, 1056, or 1058.

Figure 15:
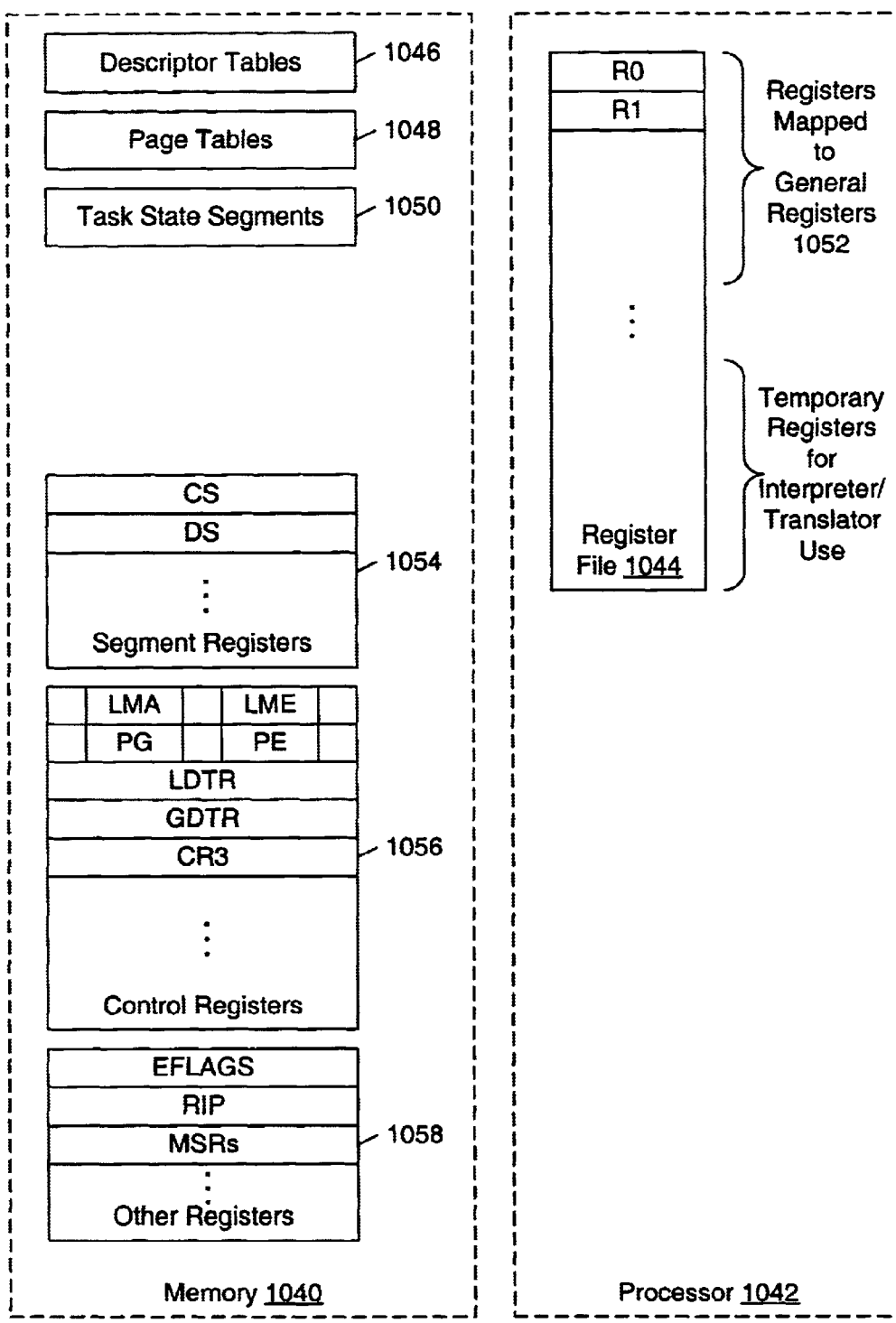
FIG. 15 is a block diagram illustrating a second embodiment of the mapping of a non-native architected state.

While the example of FIG. 14 maps all of the non-native architected state to memory 1040, other embodiments may implement other mappings. In FIG. 15, for example, some of the general registers in register file 1044 are mapped to the general registers 1052. Accordingly, if a non-native instruction has a general register as an operand, the interpreter accesses the corresponding register in register file 1044. Similarly, the translator generates a translated instruction having the corresponding register in register file 1044 as an operand. Other architected states may still be accessed via memory operations in the embodiment of FIG. 15. Other registers in register file 1044 which are not assigned to non-native architected state may again be used as temporary registers for interpreter or translator use, as described above.

While the embodiment of FIG. 15 illustrates mapping the general registers 1052 to registers in register file 1044, any other non-native architected state may be mapped to registers in register file 1044. For example, any of segment registers 1054, control registers 1056, or other registers 1058 (or portions of any of these registers) may be mapped to register file 1044, as desired.

Figure 16:
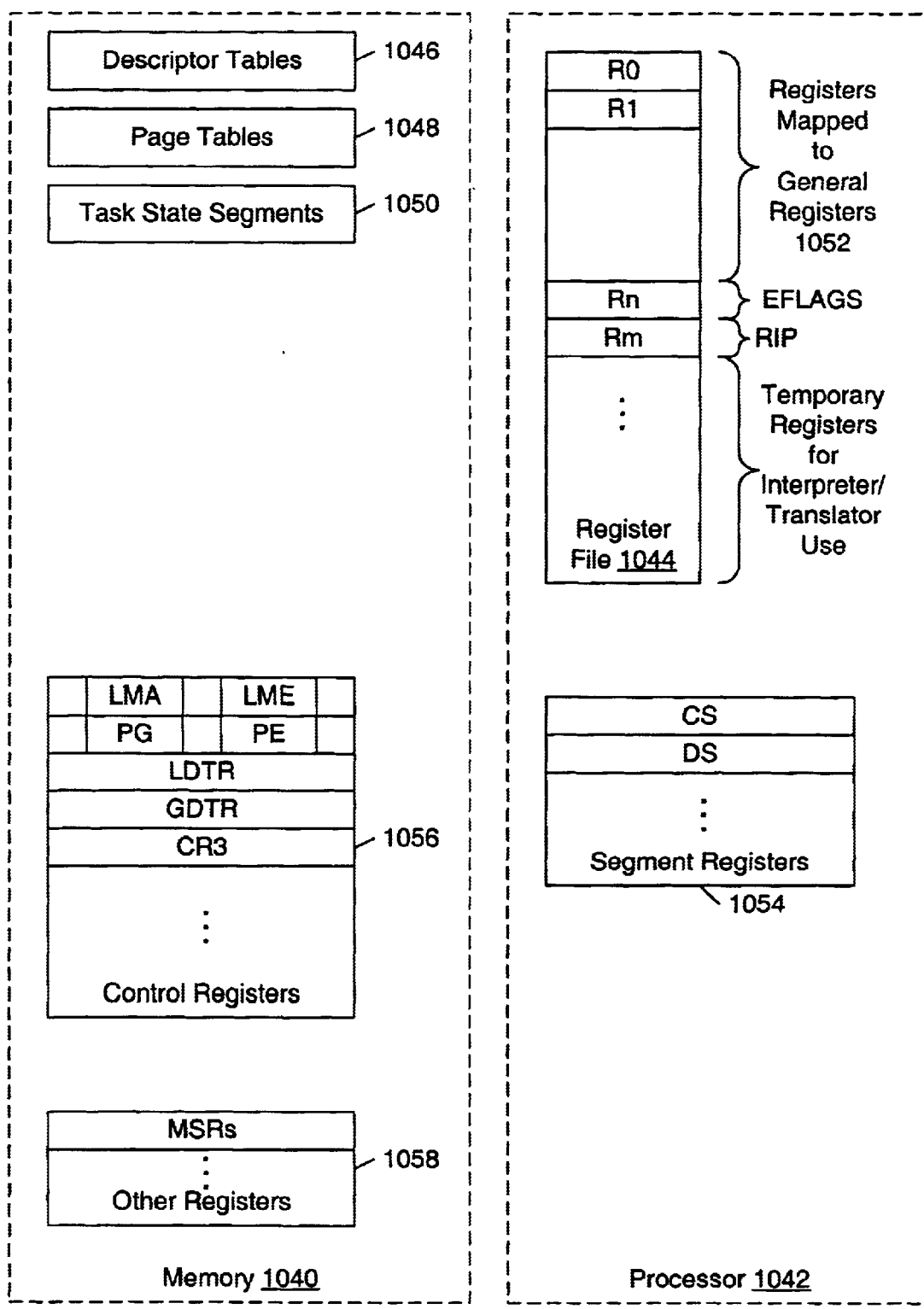
FIG. 16 is a block diagram illustrating a third embodiment of the mapping of a non-native architected state.

FIG. 16 illustrates another example in which the general registers 1052 and the EFLAGS and RIP registers are mapped to registers in register file 1044. Additionally, in the example of FIG. 16, the segment registers 1054 are implemented in hardware in processor 1042. More specifically, processor 1042 may not only implement storage for segment registers 1054, but may also include logic to determine the operating mode for instructions based on the information in the segment registers. Furthermore, for compatibility modes, the logic may include limit checks and attribute checks to ensure that accesses to the segment attempted by the non-native instructions (or the non-native instructions in the interpreter or the translated code sequence which correspond to the non-native instructions) are permitted.

Similarly, other embodiments may implement various control registers 1056 or other registers 1058 in hardware, including corresponding logic to act on the contents of the registers as defined in the non-native architecture. Generally, various embodiments of processor 1042 may implement any non-native architected state in hardware. Certain architected states may generally be implemented in memory since the non-native processor architecture defines the state to be in memory (e.g., descriptor tables 1046, pages tables 1048, and task state segments 1050). Such memory-based architected states may be cached in caches within processor 1042 (e.g., TLBs for page table information, hidden segment register portions for segment descriptor information, etc.).

As the above discussion illustrates, the non-native architected state may be stored in any suitable storage location. Generally, a storage location is a location capable of storing a value. Suitable storage locations may include, in various embodiments, a memory location, a general register mapped to the non-native architected state, or a special purpose register (which may include additional hardware to interpret the contents of the register), depending upon the embodiment. Additionally, suitable storage locations could include a scratch pad random access memory (RAM) (such as a portion of a cache predetermined to be used as scratch pad RAM).

Figure 17:
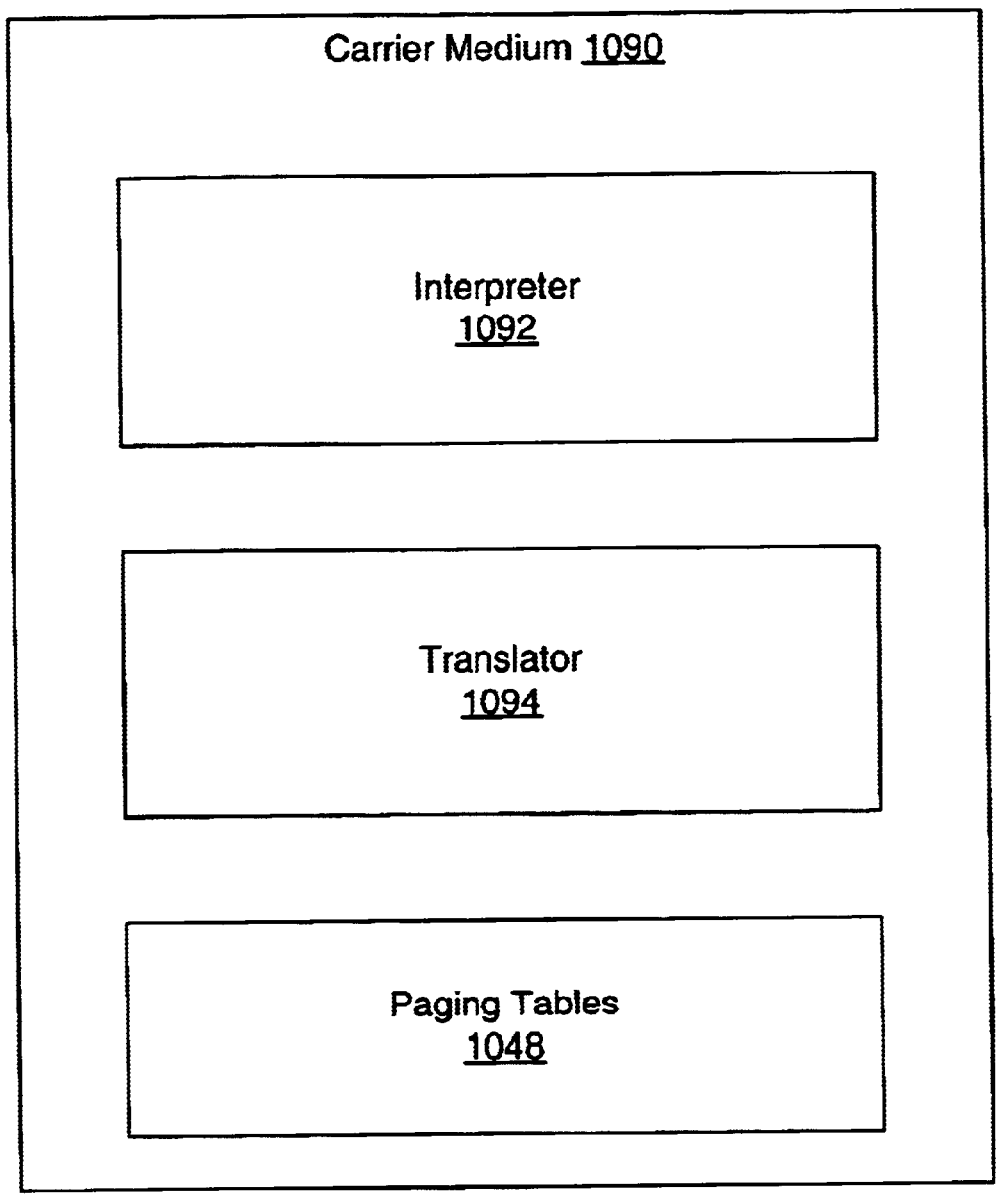
FIG. 17 is a block diagram of one embodiment of a carrier medium.

FIG. 17 is a block diagram of one embodiment of a carrier medium 1090. Other embodiments are possible and contemplated. In the embodiment of FIG. 17, carrier medium 1090 stores an interpreter program 1092, a translator program 1094, and paging tables 1048.

Generally speaking, a carrier medium may include storage media such as magnetic or optical media, e.g., disk or CD-ROM (Compact Disc Read Only Memory), volatile or non-volatile memory media such as RAM (e.g. SDRAM (Synchronous Dynamic RAM), RDRAM (RAMBUS (a registered trademark of Rambus Inc.) Dynamic RAM), SRAM (Static RAM), etc.), ROM (Read Only Memory), etc., as well as transmission media or signals such as electrical, electromagnetic, or digital signals, conveyed via a communication medium such as a network and/or a wireless link. Carrier medium 1090 may thus be coupled to a computer system including processor 1042, may be part of a computer system including processor 1042, or may be a communication medium on which the computer system is capable of communicating. Computer systems including processor 1042 may be of any construction. For example, computer systems similar to those shown in FIGS. 18 and 19 may be suitable.

Interpreter program 1090 may operate according to the flowchart of FIG. 12. Translator program 1094 may operate according to the flowchart of FIG. 13. Generally, interpreter program 1092 and translator program 1094 may each comprise code sequences including native instructions.

Computer Systems

Figure 18:
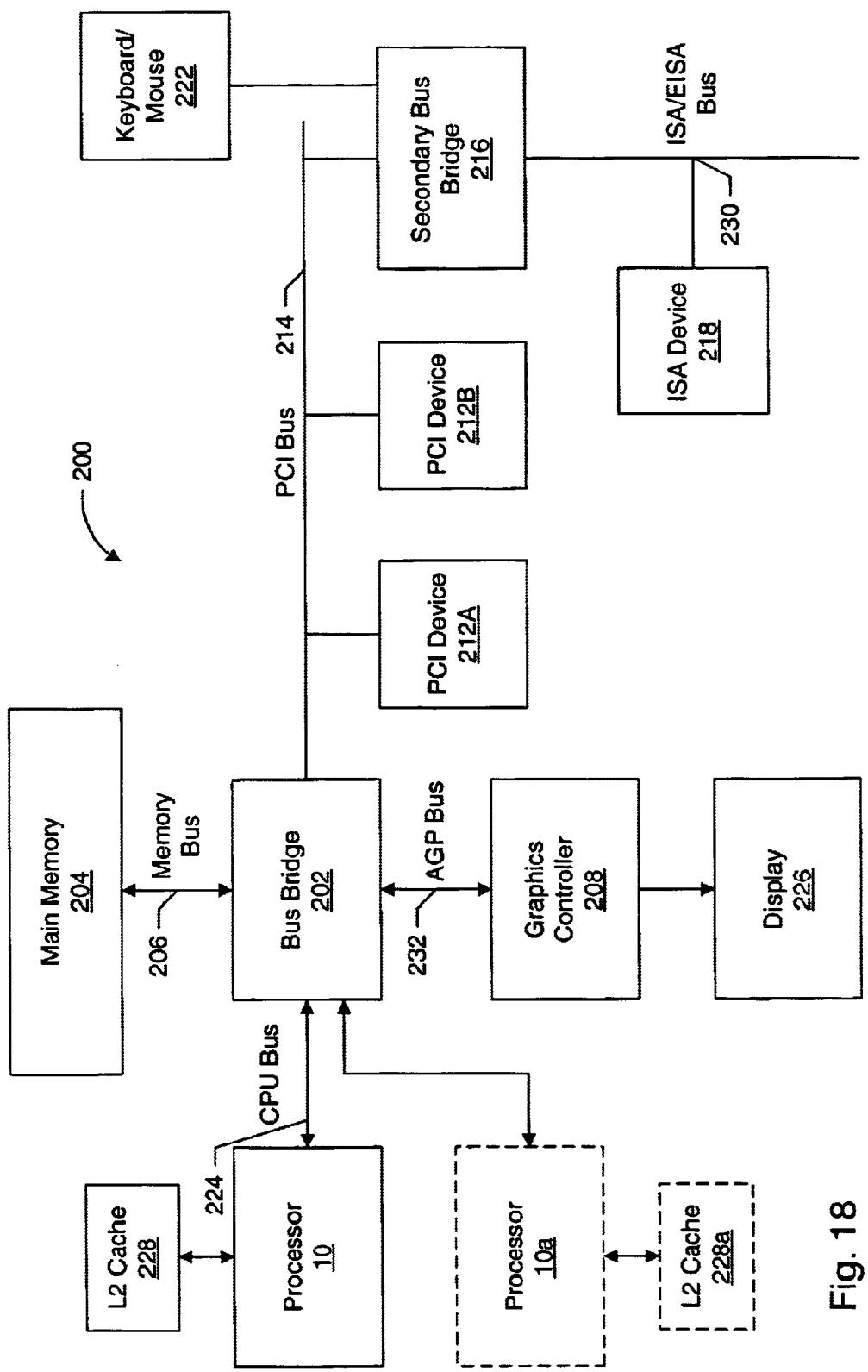
FIG. 18 is a block diagram of one embodiment of a computer system including the processor shown in FIG. 3 and/or FIG. 9.

Turning now to FIG. 18, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP (Accelerated Graphics Port) bus 232. Finally, a plurality of PCI (Peripheral Component Interconnect) devices 212A–212B are coupled to bus bridge 202 through a PCI bus 214. A secondary bus bridge 216 may further be provided to accommodate an electrical interface to one or more EISA (Extended Industry Standard Architecture) or ISA (Industry Standard Architecture) devices 218 through an EISA/ISA bus 230. Processor 10 is coupled to bus bridge 202 through a CPU (Central Processing Unit) bus 224 and to an optional L2 cache 228. Together, CPU bus 224 and the interface to L2 cache 228 may comprise an external interface to which external interface unit 18 (as shown in FIG. 3) may couple.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g., slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or RAMBUS (a registered trademark of Rambus Inc.) DRAM (RDRAM) may be suitable.

PCI devices 212A–212B are illustrative of a variety of peripheral devices. The peripheral devices may include devices for communicating with another computer system to which the devices may be coupled (e.g., network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller

208 may embody a typical graphics accelerator generally known in the art to render three-dimensional data structures that can be effectively shifted into and from main memory 204. Graphics controller 208 may therefore be a master of AGP bus 232 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 232. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode -ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g., processor 10*a* shown as an optional component of computer system 200). Processor 10*a* may be similar to processor 10. More particularly, processor 10*a* may be an identical copy of processor 10. Processor 10*a* may be connected to bus bridge 202 via an independent bus (as shown in FIG. 18) or may share CPU bus 224 with processor 10. Furthermore, processor 10*a* may be coupled to an optional L2 cache 228*a* similar to L2 cache 228.

Figure 19:
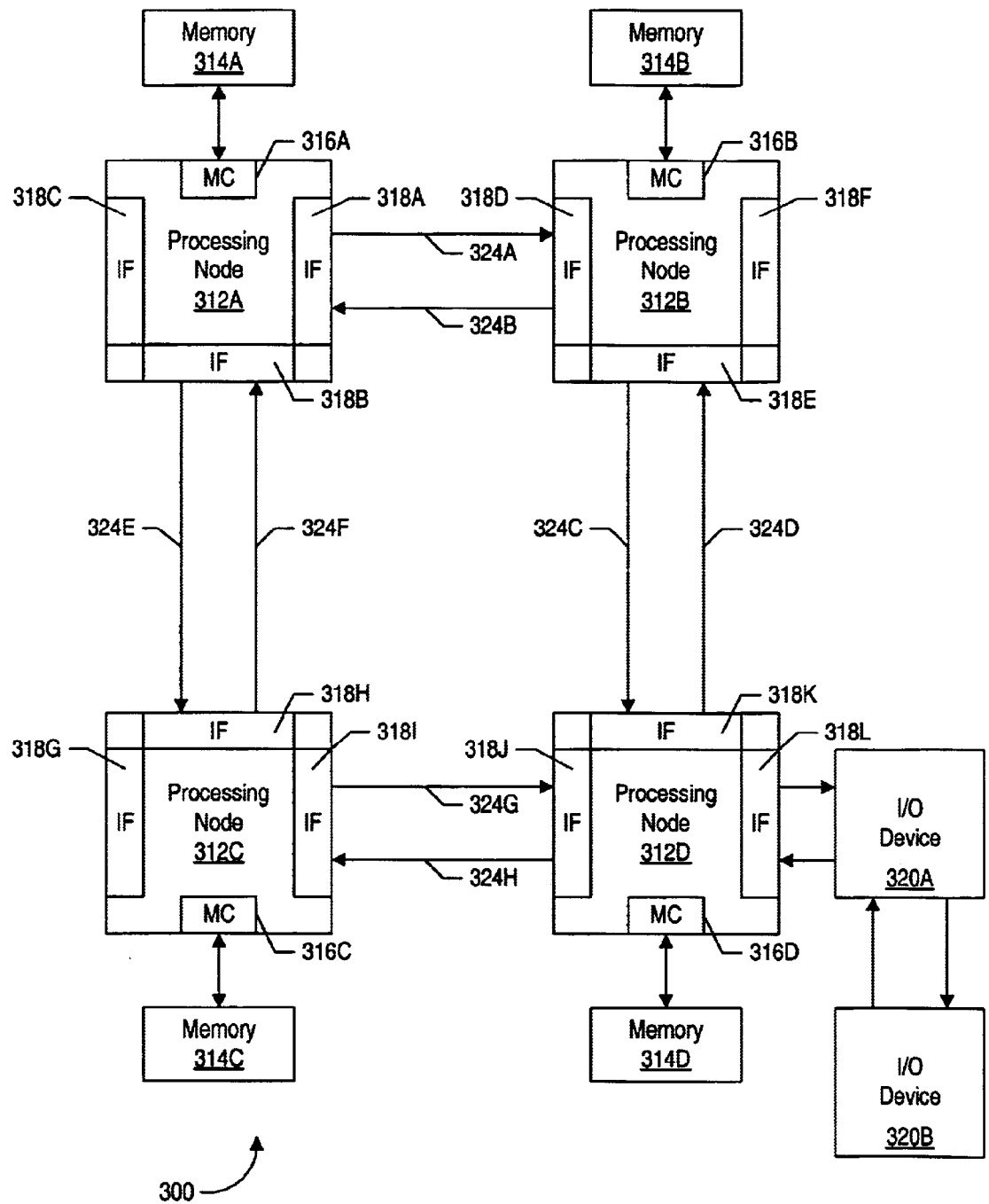
FIG. 19 is a block diagram of another embodiment of a computer system including the processor shown in FIG. 3 and/or FIG. 9.

Turning now to FIG. 19, another embodiment of a computer system 300 is shown.

Other embodiments are possible and contemplated. In the embodiment of FIG. 19, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g., devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g., lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 19. Generally, each set of lines 324 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 19. Any suitable routing algorithm may be used. Other embodiments of computer system 300 may include more or fewer processing nodes then the embodiment shown in FIG. 19.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10. External interface unit 18 (as shown in FIG. 3) may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include devices for communicating with another computer system to which the devices may be coupled (e.g., network interface cards or modems). Furthermore, I/O devices 320A–320B may include video accelerators, audio cards, hard or floppy disk drives or drive controllers, SCSI (Small Computer Systems Interface) adapters and telephony cards, sound cards, and a variety of data acquisition cards such as GPIB (General Purpose Interface Bus) or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. A processor comprising:

an execution core configured to generate a virtual address; and a translation unit configured to translate the virtual address to a physical address using:

if a first operating mode is selected, either a first page mapping mechanism or a second page mapping mechanism, wherein both the first page mapping mechanism and the second page mapping mechanism are configured to support virtual addresses having at most a first number of bits; and if a second operating mode is selected, a third page mapping mechanism configured to support virtual addresses having more than the first number bits;

wherein the translation unit is configured to translate the virtual address to the physical address using the third page mapping mechanism both when a first virtual address size having more than the first number of bits is selected and when a second virtual address size having at most the first number of bits is selected.

2. The processor of claim 1, wherein the first number of bits is 32.

3. The processor of claim 1, further comprising a configuration register configured to store an operating mode indication, wherein the translation unit is configured to translate the virtual address to the physical address using either the first page mapping mechanism or the second page mapping mechanism if the operating mode indication indicates a first operating mode, and wherein the translation unit is configured to translate the virtual address to the physical address using the third page mapping mechanism if the operating mode indication indicates a second operating mode.

4. The processor of claim 1, wherein the first page mapping mechanism supports 2 Megabyte (Mb) pages of physical memory and wherein the second page mapping mechanism supports 4 Mb pages of physical memory.

5. The processor of claim 1, wherein the third page mapping mechanism comprises at least four levels of paging tables.

6. The processor of claim 1, wherein the translation unit is implemented in microcode coded to use one of the first page mapping mechanism, the second page mapping mechanism, and the third page mapping mechanism by accessing a plurality of paging tables comprised in each page mapping mechanism in order to obtain the physical address corresponding to the virtual address.

7. The processor of claim 1, wherein each of the first page mapping mechanism, the second page mapping mechanism, and the third page mapping mechanism comprises a plurality of paging tables, wherein a same page directory base register is used to store a pointer to a first base address of a first paging table in a currently active one of the first, second, and third page mapping mechanisms irrespective of which of the first, second, or third page mapping mechanisms is the currently active one.

8. A processor comprising:

an execution core configured to generate a virtual address; and a translation unit configured to translate the virtual address to a physical address using:

if a first operating mode is selected, either a first or a second plurality of paging tables, wherein each of the paging tables in the first plurality comprises a plurality of entries that each have a first entry size, wherein each of the paging tables in the second plurality comprises a plurality of entries that each have a second entry size, wherein the second entry size is greater than the first entry size, and wherein the first plurality of paging tables and the second plurality of paging tables are each configured to support virtual addresses having at most a first number of bits; and if a second operating mode is selected, a third plurality of paging tables, wherein each of the paging tables in the third plurality comprises a plurality of entries that have the second entry size, wherein there are more levels of paging tables in the third plurality of paging tables than in the second plurality of paging tables, and wherein the third plurality of paging tables is configured to support virtual addresses having more than the first number of bits;

wherein the translation unit is configured to translate the virtual address to the physical address using the third page mapping mechanism both when a first virtual address size having more than the first number of bits is selected and when a second virtual address size having at most the first number of bits is selected.

9. The processor of claim 8, further comprising a configuration register configured to store an operating mode indication, wherein the translation unit is configured to translate the virtual address to the physical address using either the first plurality of paging tables or the second plurality of paging tables if the operating mode indication indicates a first operating mode, and wherein the translation unit is configured to translate the virtual address to the physical address using the third plurality of paging tables if the operating mode indication indicates a second operating mode.

10. The processor of claim 8, wherein the second plurality of paging tables and the third plurality of tables each supports 2 Mb pages of physical memory and wherein the first plurality of paging tables supports 4 Mb pages of physical memory.

11. The processor of claim 8, wherein the third plurality comprises at least four paging tables.

12. The processor of claim 8, wherein the first number of bits is 32.

* * * * *

UNITED STATES PATENT AND TRADEMARK OFFICE
CERTIFICATE OF CORRECTION

| | |
|---|---|
| PATENT NO. | : 6,671,791 B1 |
| APPLICATION NO. | : 09/881910 |
| DATED | : December 30, 2003 |
| INVENTOR(S) | : Kevin J. McGrath |

It is certified that error appears in the above-identified patent and that said Letters Patent is hereby corrected as shown below:

In the Claims:

Column 32, Claim 8, Lines 40-41, please delete "the third page mapping mechanism" and substitute -- the third plurality of paging tables --

Signed and Sealed this
Fourteenth Day of April, 2015

Michelle K. Lee
*Director of the United States Patent and Trademark Office*